United States Patent [19]

Kikuchi et al.

[11] Patent Number: 5,546,763
[45] Date of Patent: Aug. 20, 1996

[54] METHOD OF AND APPARATUS FOR CRYSTALLIZATION

[75] Inventors: Kazuo Kikuchi; Hiroshi Umino; Hiromitsu Shibuya; Masahito Makino, all of Yokohama; Yasuyuki Sakakura; Kiyoshi Takahashi, both of Yokkaichi, all of Japan

[73] Assignee: JGC Corporation, Tokyo, Japan

[21] Appl. No.: 321,995

[22] Filed: Oct. 12, 1994

[30] Foreign Application Priority Data

Oct. 13, 1993 [JP] Japan .................................. 5-280457
Oct. 4, 1994 [JP] Japan .................................. 6-266362

[51] Int. Cl.⁶ ............................................. B01D 9/04
[52] U.S. Cl. ............................................. 62/532; 62/123
[58] Field of Search .......................... 62/123, 124, 532; 165/61

[56] References Cited

U.S. PATENT DOCUMENTS

| Re. 32,241 | 9/1986 | Saxer . | |
|---|---|---|---|
| 3,275,529 | 9/1966 | Kehoe et al. . | |
| 3,621,664 | 11/1971 | Saxer . | |
| 4,002,198 | 1/1977 | Wagner et al. | 165/61 |
| 4,162,617 | 7/1979 | Schmidt et al. . | |
| 4,175,935 | 11/1979 | Gutermuth | 165/61 |
| 4,335,581 | 6/1982 | Nail . | |
| 4,493,719 | 1/1985 | Wintermantel et al. . | |

FOREIGN PATENT DOCUMENTS

| 128835A1 | 12/1984 | European Pat. Off. . |
|---|---|---|
| 1052023 | 1/1954 | France . |
| 279526 | 10/1927 | United Kingdom . |

OTHER PUBLICATIONS

"Introduction To Easy Practical Crystallization Process", pp. 76–83, Sep. 1992, Masakuni Matsuoka.
"Handbook Of Industrial Crystallization", edited by Alan Myerson, 1993.

*Primary Examiner*—Ronald C. Capossella
*Attorney, Agent, or Firm*—Lowe, Price, LeBlanc & Becker

[57] ABSTRACT

Crystallization method and crystallization apparatus each use vertical plates for crystallization thereon. Both surfaces of the plate are used for different two liquids to flow down as films. Specifically, on one vertical surface, a feed liquid mixture containing crystallizable components therein flows down as a film, and on an opposite vertical surface, a cooling medium flows down as a film. Accordingly, the crystallizable component contained in the feed liquid mixture is cooled and crystallized to form crystal layers on the one vertical surface of the plate. The formed crystal layers are melted by a heating medium which flows down on the opposite vertical surface, and are collected as a melt. A pair of the plates may be used to form a unit to purify the liquid mixture on a large scale. A number of the units may be used to form a block which is suitable for a larger-scale crystallization processing. Further, a number of the blocks may be used to purify the liquid mixtures on a further larger-scale processing.

18 Claims, 13 Drawing Sheets

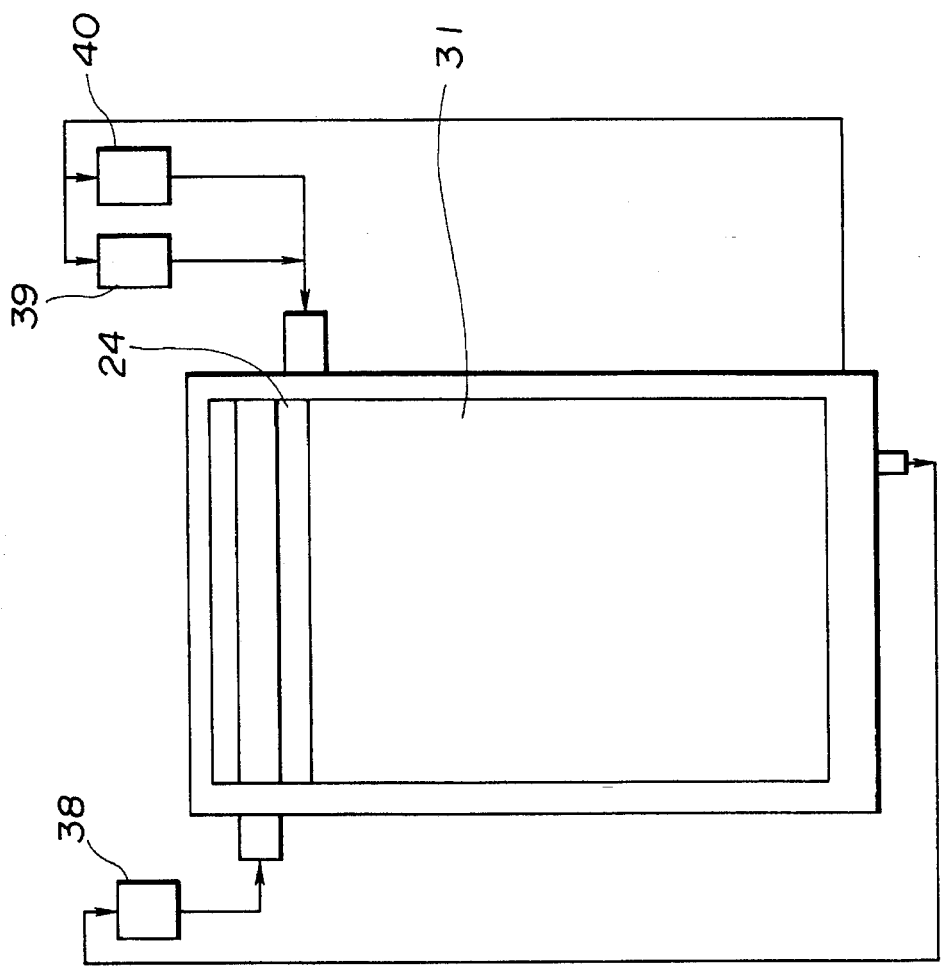
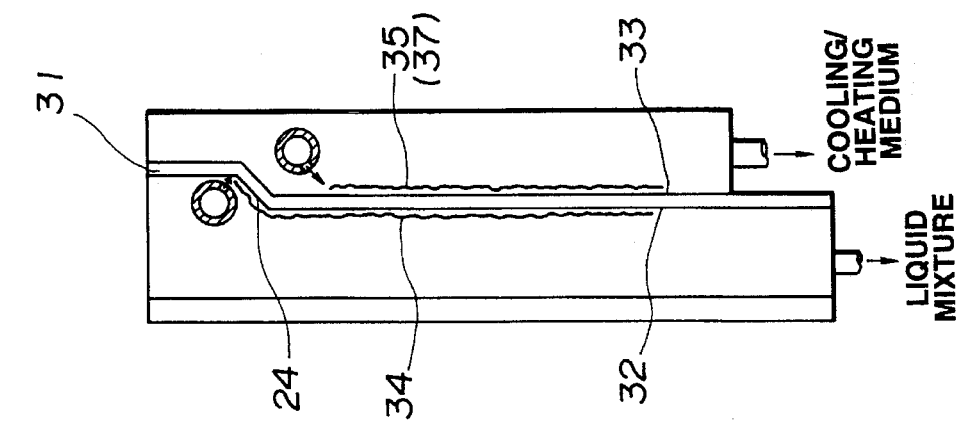

METHOD OF AND APPARATUS FOR CRYSTALLIZATION

BACKGROUND OF THE INVENTION

1. Field of the Invention

The present invention relates to a method of and an apparatus for obtaining high-purity products by crystallization from liquid mixtures containing crystallizable components, and further relates to the foregoing method and apparatus which are particularly suitable for large-scale purification processes. More specifically, the present invention is suitable for large-scale and multi-stage purification of acrylic acid and methacrylic acid.

2. Description of the Prior Art

It is known, for example, that commercially produced acrylic acid usually contains such impurity components as acetic acid and propionic acid and the concentrations of these impurities are about 0.1% in total. Recently, usage of acrylic acid has been expanded, and in some cases, very high-purity acrylic acids are required. For example, the impurity concentrations in the order of some tens to hundreds of ppm are required for paper diapers.

In general, impurities are removed by distillation. However, it is very difficult to remove such impurities as acetic acid and propionic acid by distillation since these impurity components have boiling points close to that of acrylic acid. Under such circumstances, it has been proposed to remove these impurities by crystallization.

Two typical crystallization methods are available; one being that seed crystals are put into a liquid mixture containing a crystallizable component so as to nucleate and grow crystals in a suspended state in the liquid, and the other being crystals are formed and grown on cooled surfaces.

A mixing vessel type crystallizer is used for the former method. In this type of crystallizer, however, heat exchange area tends to be insufficient to produce a large quantity of crystals from liquid mixtures. Further, in case of adhesive crystals, such as, acrylic acid, cooling coils can not be used although it is necessary to scrape the crystals off the cooled surfaces. Therefore, the heat exchange area is definitely insufficient. Moreover, since solid-liquid separation is unavoidable, the structure and operations of this type of crystallizer are complicated to perform multi-stage crystallization.

The latter method is described in, such literatures as, "Handbook of Industrial Crystallization, Butterworth-Helnemann, 1993" edited by A. S. Myerson and "Introduction to Easy Practical Crystallization Process (KEMIKARU ENJINIARINGU), pages 76-83" September, 1992 by Masakuni MATSUOKA. According to these literatures, the latter method is advantageous in view of easy handling and of high crystallization rate. On the other hand, disadvantage is that the purity of the crystals is low since the impurities are trapped within the crystal layers in the course of crystallization. These literatures further indicated that the so-called sweating or partial melting of crystals is effective for removing the trapped impurities to improve the purity of the crystals.

U.S. Pat. No. Re. 32,241 which is the reissue of U.S. Pat. No. 3,621,664 discloses a multi-stage fractional crystallization technique for performing the latter method. In this crystallization technique, the crystals are grown on inner tube surfaces. However, this crystallization technique has a drawback that crystallization area, that is, heat exchange area decreases as crystallization proceeds since inner diameters of the crystal layers are reduced as the crystallization proceeds. Melting of crystals starts from the crystals contacting the tube inner surfaces. As a result, outer diameters of the crystal layers reduce and thus crystals are isolated from the tube inner surfaces so that the disclosed crystallization technique has a further drawback that the crystals tend to fall off the tube inner surfaces during the melting step. In this case, for example, metal screens or grids are provided at the bottoms of the tubes to prevent the crystals from falling off due to the clearance caused between the tube inner surfaces and the crystals. However, heat transfer rates are significantly lowered and extremely long time is required to melt the crystals. Although the recovered melt is heated and supplied into the tubes, the liquid flows through the space between the tube inner surface and the crystals and does not work to reduce melting time. These drawbacks are present even when the crystal layers are formed on the tube outer surfaces. Still further, in case of using a number of tubes in parallel, it is not easy to supply uniformly the liquid mixtures and the heat transfer mediums to those tubes and to form uniform films. Furthermore, it is costly to assemble a large number of tubes in parallel.

On the other hand, another type of crystallizer is known, which is similar to usual plate heat exchanger. In this type of crystallizer, however, fluid flowing passages are narrow and very complicated. In addition, both of the liquid mixture and the heat transfer mediums should flow filling up the fluid passages and should flow upward. Accordingly, considerably sufficient strength is required for the plates and the structures of the crystallizer. Further, crystallization rates are not high enough and purification is not so effective. Moreover, scale-up of the crystallizer is not easy from a practical point of view.

SUMMARY OF THE INVENTION

Therefore, it is an object of the present invention to provide an improved crystallization method.

It is another object of the present invention to provide an improved crystallization apparatus.

According to one aspect of the present invention, a method of separating a crystallizable component contained in a liquid mixture comprises the steps of circulating the liquid mixture to one side surface of a vertical plate, the mixture flowing down on the one side surface of the plate or crystal layers as a film; supplying a cooling medium of a temperature lower than a freezing point of the liquid mixture onto an opposite side surface of the plate, the cooling medium flowing down on the opposite side surface of the plate as a film so as to form a desired amount of crystals of the crystallizable component on the one side surface; and supplying a heating medium of a temperature higher than a freezing point of the crystals onto the opposite side surface, the heating medium flowing down on the opposite side surface as a film so as to melt and recover the crystals formed on the one side surface of the plate.

According to another aspect of the present invention, a method of performing crystallization steps repeatedly in a multi-stage manner, each crystallization stage separating crystals of a crystallizable component contained in a liquid mixture and a mother liquor as a residual liquid mixture, comprises the steps of circulating, in a current crystallization stage (Nth stage), the liquid mixture to one side surface of a vertical plate via an inclined plate surface located at an upper portion of the plate, the mixture flowing down on the one side surface of the plate or crystal layers as a film; circulating, in the Nth crystallization stage, a cooling medium of a temperature lower than a freezing point of the liquid mixture to an opposite side surface of the plate, the cooling medium flowing down on the opposite side surface as a film so as to obtain a desired amount of crystals on the one side surface and the residual mother liquor; using the mother liquor from the Nth crystallization stage as a feed liquid for an (N−1)th crystallization stage, by adding the mother liquor to a feed liquid mixture to be supplied for the (N−1)th crystallization stage; circulating, in the Nth crystallization stage, a heating medium of a temperature higher than a freezing point of the crystals to the opposite side surface, the heating medium flowing down on the opposite side surface as a film so as to melt and recover the crystals formed on the one side surface of the plate; heating, in the Nth crystallization stage, the liquid mixture for an (N+1)th crystallization stage and introducing the heated liquid mixture to the one side surface at the Nth crystallization stage so as to rapidly melt and recover the crystals; and using, in the (N+1)th crystallization stage, the melt of the crystals recovered in the Nth crystallization stage as the liquid mixture.

According to another aspect of the present invention, an apparatus for separating a crystallizable component contained in a liquid mixture comprises a vertical plate; liquid mixture feeding means for circulating the liquid mixture to one side surface of the plate, the mixture flowing down on the one side surface of the plate or crystal layers as a film; cooling medium feeding means for supplying a cooling medium of a temperature lower than a freezing point of the liquid mixture to an opposite side surface of the plate, the cooling medium flowing down on the opposite side surface of the plate as a film; and heating medium feeding means for supplying a heating medium of a temperature higher than a freezing point of the crystals to the opposite side surface of the plate, the heating medium flowing down on the opposite side surface as a film.

According to another aspect of the present invention, an apparatus for separating a crystallizable component contained in a liquid mixture comprises a unit including a pair of vertical flat plates each having an inwardly bent inclined surface at its upper portion, the pair of the plates jointed each other at the top ends of the plates with the inclined surfaces; liquid mixture feeding means for circulating the liquid mixture to outer surfaces of the plates of the unit, the liquid mixture flowing down on the outer surfaces of the plates of the unit including crystal layer surfaces as films; cooling medium feeding means for circulating a cooling medium of a temperature lower than a freezing point of the liquid mixture to inner surfaces of the plates of the unit, the cooling medium flowing down on the inner surfaces of the plates of the unit as films; and heating medium feeding means for circulating a heating medium of a temperature higher than a freezing point of the crystals to the inner surfaces of the plates, the heating medium flowing down on the inner surfaces as films.

According to another aspect of the present invention, an apparatus for separating a crystallizable component contained in a feed liquid mixture comprises a block having a number of units which are assembled in parallel with a specified clearance therebetween, each of the units including a pair of vertical flat plates each having an inwardly bent inclined surface at its upper portion, the pair of the plates jointed each other at the top ends of the plates with the inclined surfaces; liquid mixture feeding means for circulating the liquid mixture to outer surfaces of the plates of each unit, the mixture flowing down as films on the outer surfaces of the plates of each unit including the inclined surfaces and crystal layers; cooling medium feeding means for circulating a cooling medium of a temperature lower than a freezing point of the liquid mixture to inner surfaces of the plates of each unit, the cooling medium flowing down on the inner surfaces as films; and heating medium feeding means for circulating a heating medium of a temperature higher than a freezing point of the crystals to the inner surfaces of the plates of each unit, the heating medium flowing down on the inner surfaces as films.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIGS. 3A and 3B are diagrams, respectively, for showing a manner of supplying the liquid mixture uniformly over a lateral width of the plate, wherein FIG. 3A is a schematic side view and FIG. 3B is a schematic front view;

FIGS. 5A and 5B are diagrams, respectively, for showing another manner of supplying the liquid mixture uniformly over the lateral width of the plate, wherein FIG. 5A is a schematic side view and FIG. 5B is a schematic front view;

FIGS. 7A and 7B are diagrams, respectively, for explaining a structure of a crystallization apparatus according to a second preferred embodiment of the present invention, wherein FIG. 7A is a schematic side view and FIG. 7B is a schematic front view;

FIGS. 8A and 8B are diagrams, respectively, for explaining a structure of a crystallization apparatus according to a third preferred embodiment of the present invention, wherein FIG. 8A is a schematic side view and FIG. 8B is a schematic front view;

DESCRIPTION OF THE PREFERRED EMBODIMENT

Now, preferred embodiments of the present invention will be described hereinbelow with reference to the accompanying drawings.

A crystallization method will be first described hereinbelow according to a first preferred embodiment of the present invention.

Figure 1:
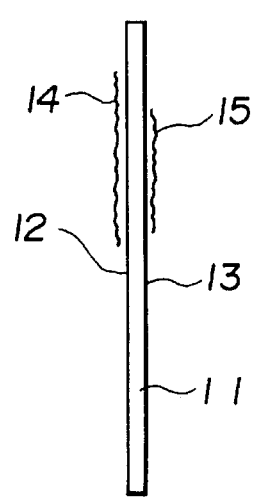
FIG. 1 is a diagram for explaining a crystallization method according to a first preferred embodiment of the present invention, wherein one crystallization step is proceeding.
Figure 2:
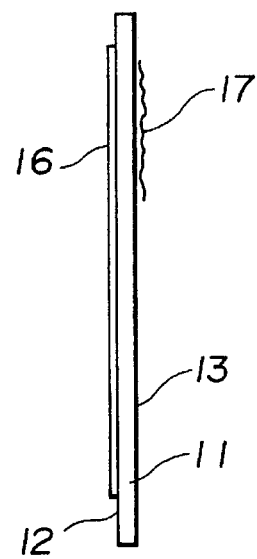
FIG. 2 is a diagram for explaining the crystallization method according to the first preferred embodiment, wherein one melting step is proceeding.

As shown in FIG. 1, in the crystallization method of the first preferred embodiment, a plate 11 is used as a base element on which crystallization advances. Specifically, the plate 11 is of a flat shape and vertically arranged so as to have one vertical surface 12 and an opposite vertical surface 13. A liquid mixture 14 containing a crystallizable component is circulated to flow down on the one vertical surface 12 as a film. On the other hand, a cooling medium 15 of a temperature lower than a freezing point of the liquid mixture is introduced to flow down on the opposite vertical surface 13 as a film for cooling the liquid mixture 14 so as to form and separate the crystals of the crystallizable component on the one vertical surface 12. The cooling medium 15 may be circulated and used repeatedly. By continuing the foregoing steps, a layer 16 of the crystals gradually grows on the one vertical surface 12 of the plate 11 as shown in FIG. 2.

When a thickness of the crystal layer 16 reaches a predetermined value, a mother liquor, that is, the residual liquid mixture 14, is drained off. Thereafter, as shown in FIG. 2, a heating medium 17 of a temperature higher than the freezing point of the formed crystal layer 16 is introduced to flow down on the opposite vertical surface 13 of the plate 11 as a film so as to melt the crystals. The melt flows down on the one vertical surface 12 and is collected or recovered. It is to be appreciated that, when the thickness of the crystal layer 16 is too thin, the impurities tend to be trapped within the crystal layers lowering the purity of the recovered melt. On the other hand, when the thickness becomes too thick, the conductive heat flux through the crystal layer is reduced to prolong the time for crystallization. Accordingly, the thicknesses of the crystal layers are preferably 5 mm to 20 mm, and more preferably, 7 mm to 15 mm. The heating medium 17 may be circulated and used repeatedly. By continuing the foregoing step, the crystal layer 16 attached to the one vertical surface 12 is totally melted, and the collected melt has a lower impurity concentration as compared with that of the feed liquid mixture.

On the other hand, when a further lowered impurity concentration is required, the melt obtained through the foregoing single-stage operation may be used again as the feed liquid mixture so as to repeat the foregoing processes. By performing the process in a multi-stage manner, the melt with high purity, for example, impurity concentrations of some tens of ppm can be finally obtained. When performing the multi-stage process, it is preferable not to reuse the mother liquor obtained at an Nth stage by adding it to the liquid mixture for the Nth stage, but to reuse the mother liquor from the Nth stage by adding it to the liquid mixture for an (N−1)th stage which is one stage prior to the Nth stage. Further, it is preferable to use the melt obtained at the (N−1)th stage as the liquid mixture for the next Nth stage. It is further preferable that the liquid mixture 14 for an (N+1)th stage, which has a higher purity, be heated and introduced to flow down on the one vertical surface 12, that is, over the crystal layer 16, simultaneously circulating the heating medium 17 of the specified temperature to flow down on the opposite vertical surface 13 as a film, so as to accelerate melting of the crystals at the Nth stage, and that the melt collected at the Nth stage is cooled to obtain the new crystal layer 16 and the mother liquor at the (N+1)th stage, the mother liquor reused by adding it to the liquid mixture 14 for the Nth stage. It is to be noted that, when the crystals are separated from the liquid mixture at the Nth stage, the impurity concentrations are higher in the mother liquor than in the feed liquid mixture. Accordingly, when this mother liquor is used repeatedly as the feed liquid mixture at the Nth stage, the impurity concentrations of the liquid mixture gradually increase and the impurity concentrations in the separated crystal layers also gradually increase.

Figure 3A:
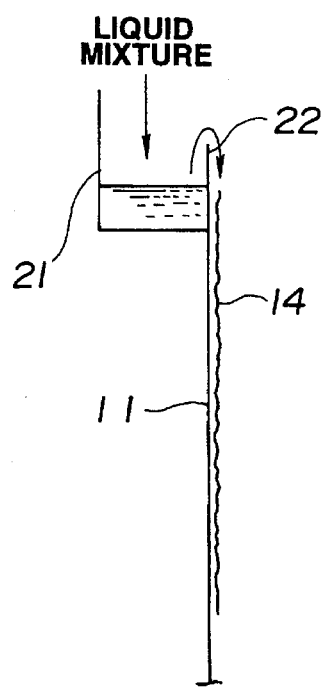
Figure 3B:
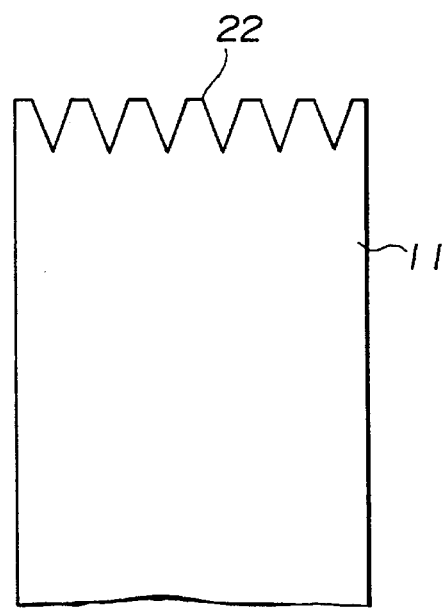
Figure 4:
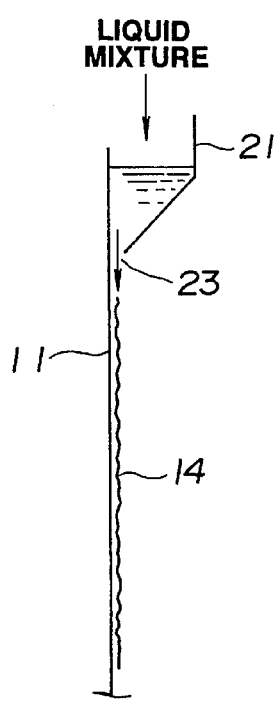
FIG. 4 is a diagram for showing another manner of supplying the liquid mixture uniformly over the lateral width of the plate.
Figure 6:
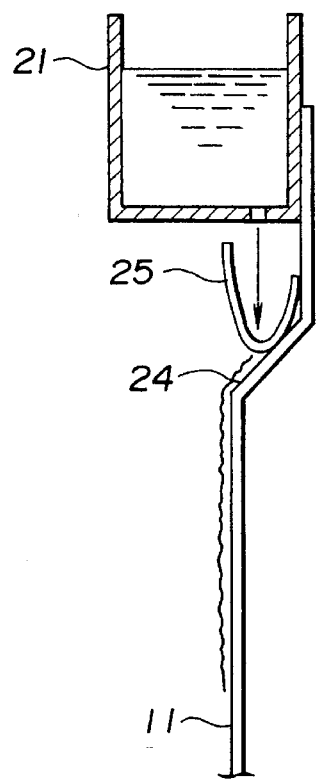
FIG. 6 is a diagram for showing another manner of supplying the liquid mixture uniformly over the lateral width of the plate.
Figure 5A:
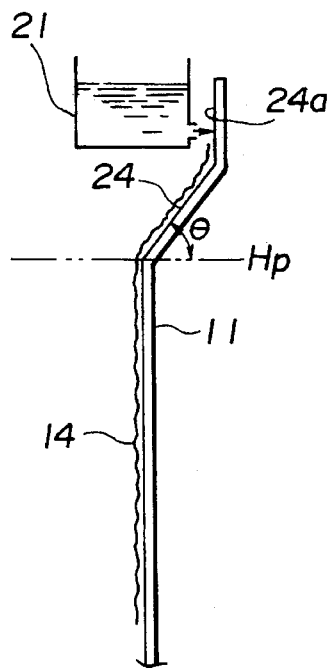
Figure 5B:
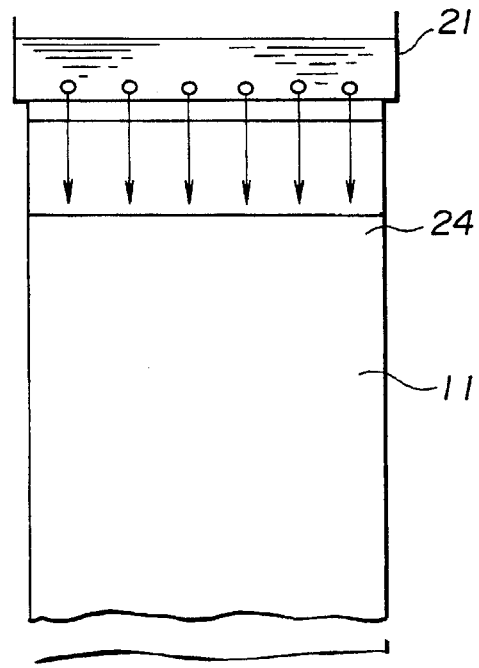
Figure 15:
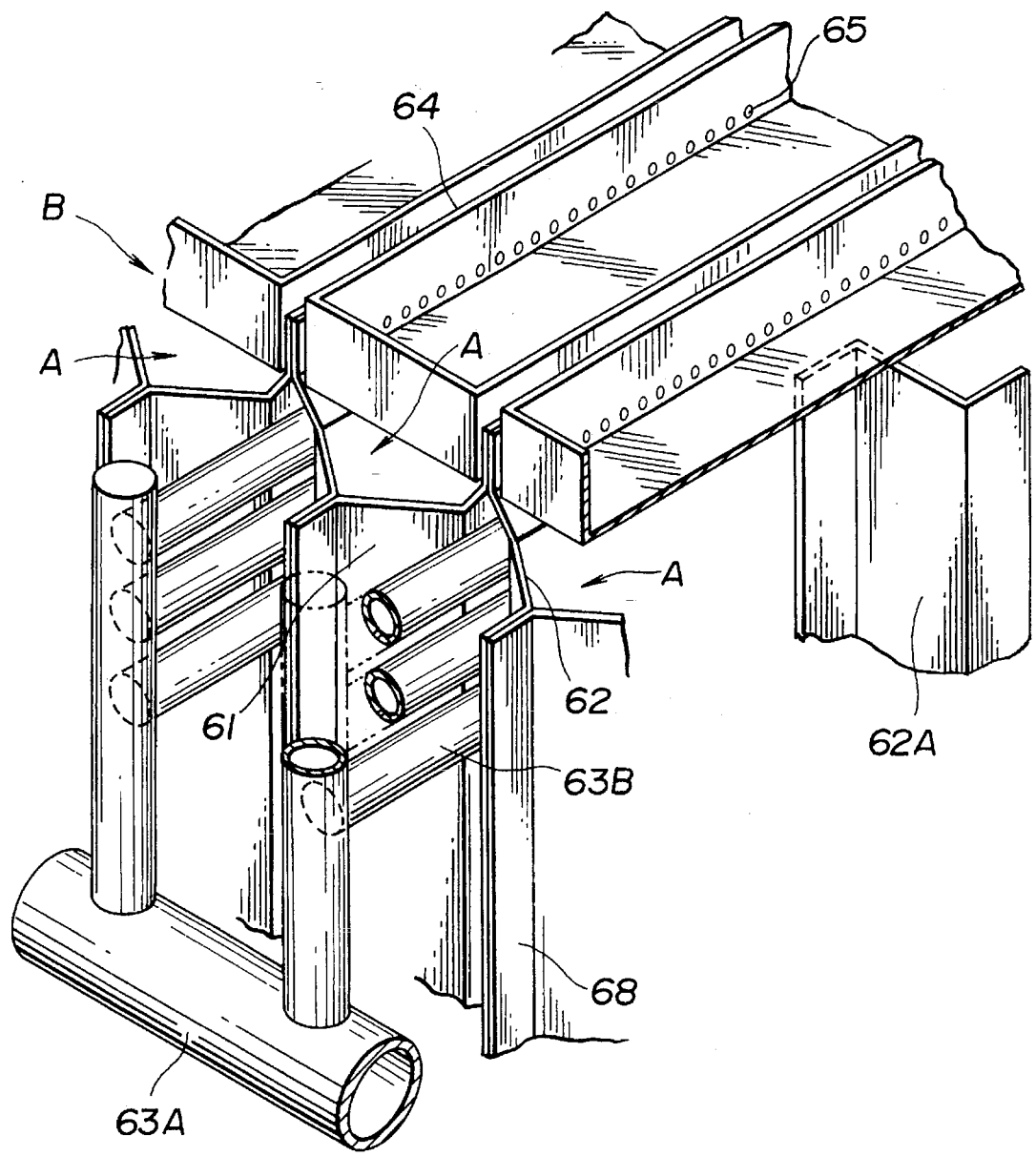
FIG. 15 is a perspective view showing a main portion of the crystallization apparatus according to the sixth preferred embodiment.

In the foregoing crystallization method, although various manners may be taken for circulating the liquid mixture 14 to flow down on the one vertical surface 12 of the plate 11 as a film, it is preferable to circulate the liquid mixture uniformly, i.e. at substantially uniform rates, over a full lateral width of the plate 11. In order to realize the uniform liquid supply, as shown in FIGS. 3A and 3B, the plate 11 is formed at the upper portion with a plurality of notches 22 through which the liquid mixture 14 is introduced from a liquid distributor 21 to flow down on the one vertical surface 11 as a uniform film. Alternatively, as shown in FIG. 4, a slit 23 is formed at the lower portion of the liquid distributor 21 along the lateral width of the plate 11 to feed the 11quid mixture 14 therethrough as a uniform film. Alternatively, as shown In FIGS. 5A 15 and 5B, the upper portion of the plate 11 is bent to provide an inclined surface 24 and a vertical surface 24a extending upward from the upper end of the inclined surface 24, and the liquid mixture 14 is introduced down onto the inclined surface 24 from the liquid distributor 21 so as to flow down on the one vertical surface 12 as a uniform film. The 11quid distributor 21 is formed at its side walls or bottom with a plurality of openings along the width of the plate 11 to feed the liquid mixture uniformly onto the inclined surface 24. In this case, although the liquid mixture may be directly supplied onto the inclined surface 24 as shown in FIGS. 5A and 5B, it may also be arranged that the liquid mixture is first fed onto the vertical surface 24a to flow down on the one vertical surface 11 via the inclined surface 24. Preferably, an angle θ of the inclined surface 24 relative to the horizontal plane Hp is from 20 degrees to 80 degrees, and more preferably, from 30 degrees to 60 degrees. When the plate 11 is inclined in the width direction with the angle θ being too small, the flow of the liquid mixture on the inclined surface 24 tends to deflect and departs from film flow. To the contrary, when the angle θ is too large, the rectifying effect, that is, the effect of diverging or dispersing the liquid mixture flow laterally so as to uniform the liquid flow thicknesses thereof in the width direction, is inevitably diminished. Experiments have shown degree of that uniformity of the thicknesses of the crystal layers 16 was remarkable when the angle θ was smaller than 20 degrees or greater than 80 degrees. As shown in FIG. 6, a redistributor 25 made of, such as, metal screens or porous materials may be placed just under the portion where the liquid mixture 14 is introduced onto the plate 11 from the liquid distributor 21. As appreciated, the redistributor 25 may also be prodded in the structures shown in FIGS. 3A, 3B or FIG. 4 in a similar manner.

Among the liquid distribution arrangements shown in FIGS. 3A, 3B, 4, 5A and 5B, one shown in FIGS. 5A, 5B may be the most desirable in view of reliability of the operation, manufacturing facility, suitability for mass-processing of the liquid mixture and the like.

No particular limitation is required for thickness and shape of the plate 11 as long as it can bear the load applied from the crystals attached thereto and the liquid film flowing down thereon. In view of heat conduction, smaller thicknesses of the plate 11 are desirable. However, in view of economical purchasing, thicknesses of 0.5 mm to 2.0 mm are desirable, and thicknesses of 0.6 mm to 1.2 mm are more desirable. Further, the plate 11 is not limited to flat shape, but may have waved or corrugated shapes or the like. However, the waved or corrugated plate is difficult to produce, and nevertheless is liable to cause the flow maldistribution for the liquid mixture to deflect in lateral directions of the plate, that is, to cause non-uniform thickness of the liquid film and the crystal layers. On the other hand, the flat plates can be easily manufactured, and work to produce uniform liquid flows over the entire width of the plate compared with the waved or corrugated plates. Accordingly, it is preferable to use the flat plates for crystallization thereon.

Materials of the plate 11 are not particularly limited, either. Specifically, the plate 11 may be formed of metal or glass plates or the like. Among them, however, metal plates, particularly, iron or stainless steel plates are preferable for forming plates in view of their high heat transfer performances, possible thin thicknesses, and low prices. Size of the plate 11 is not particularly limited, meaning that the plate size may be determined in consideration of the workability and the production capacity of the crystallizer. Further, the cooling medium 15 and the heating medium 17 may be separately provided, or the same medium may be used as the cooling or heating medium, that is, one medium may be used as the cooling medium 15 when cooled and as the heating medium 17 when heated.

Further, in order to produce uniform thicknesses of the films of the liquid mixture, supplying flow rates of the liquid mixture are, although it depends on the physical properties of the liquid mixture, particularly, surface tension thereof, preferably no smaller than 0.1 ton/h (0.1 tons per hour) per 1 meter width of the plate, and more preferably no smaller than 0.25 ton/h per 1 meter width of the plate. The upper limit of the supplying flow rates are not necessarily defined as long as the liquid mixture flows as a film. The temperatures of the liquid mixture are preferably within +5° C. and more preferably within +1° C. above the freezing point of the liquid mixture. Further, the temperatures of the cooling medium are not particularly limited as long as they are lower than the freezing point of the liquid mixture. On the other hand, at the initial stage of the crystallization where crystallization begins, rapid crystallization lowers the purity of the crystals, therefore temperatures of the cooling medium are preferably in the range between the freezing point of the liquid mixture minus 20° C. and the freezing point of the liquid mixture.

Further, in the foregoing crystallization method, it is preferable to perform sweating process if necessary. The sweating process is carried out by partially melting the crystal layers to remove high-impurity-concentration liquids trapped between the crystal layers or adhered to the crystal surfaces, so as to further decrease impurity concentrations of the crystal layers.

Specifically, before introducing the heating medium 17 of the temperature higher than the freezing point of the crystals onto the opposite vertical surface 13 of the plate 11 as shown in FIG. 2, the heating medium where temperature is within +5° C. of the melting point of the crystals, is introduced to the vertical surface 13 as a film so as to partially melt the crystal layers.

Further, when melting the crystals by introducing the heating medium 17 with the temperature higher than the freezing point of the crystals along the opposite vertical surface 13 as shown in FIG. 2, it may be effective that the melt is heated and circulated to flow down over the crystal layer 16 to accelerate melting of the crystals.

Now, a second preferred embodiment of the present invention will be described hereinbelow with reference to FIGS. 7A and 7B. The second preferred embodiment relates to a crystallizer or a crystallization apparatus.

Figure 7B:
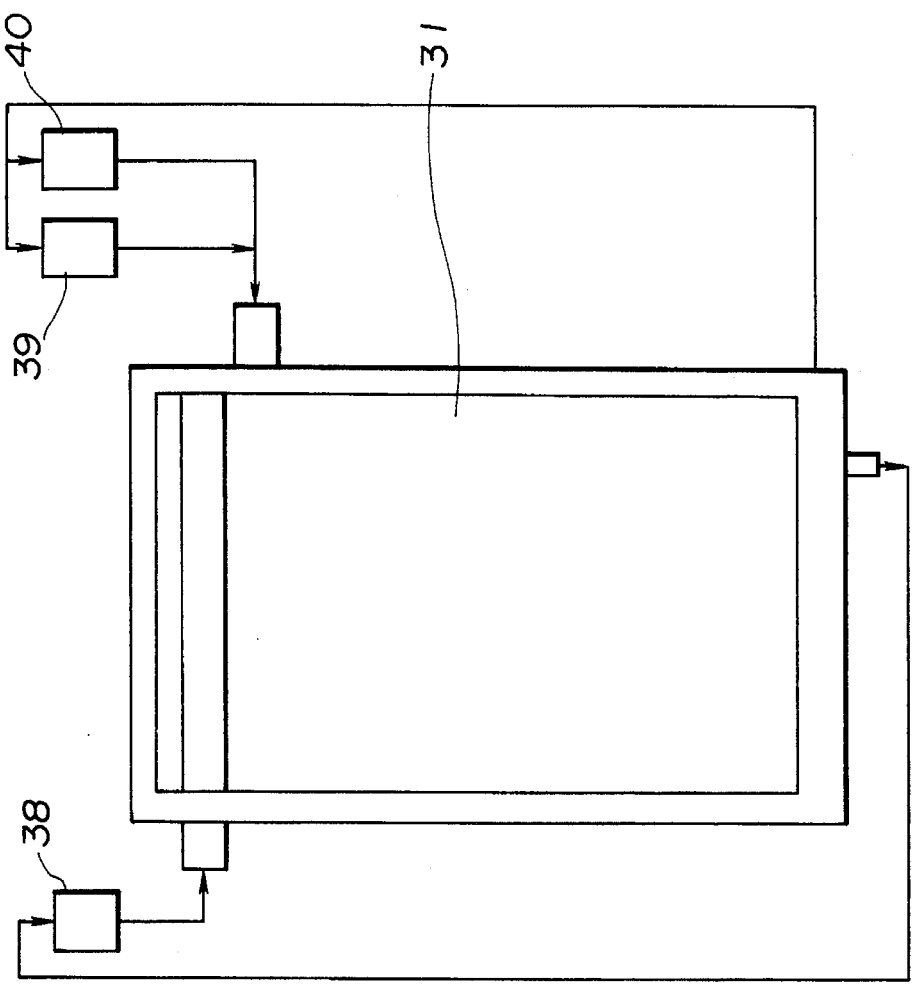
Figure 7A:
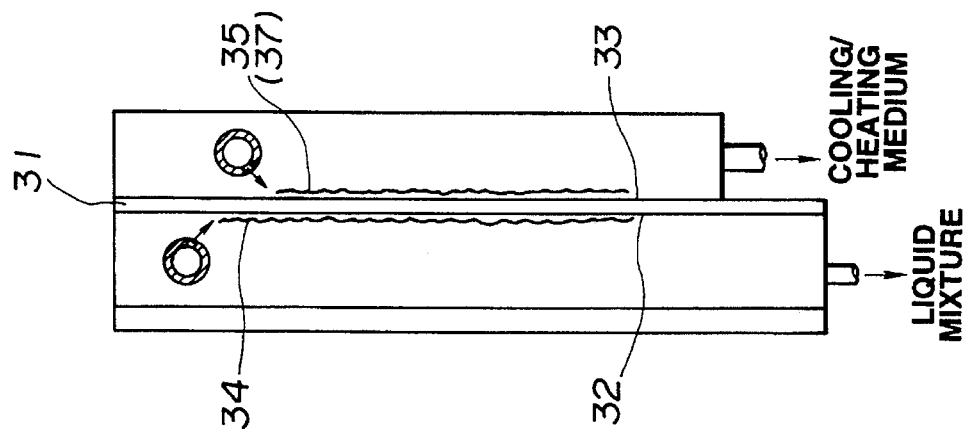

The crystallization apparatus shown in FIGS. 7A and 7B includes a plate 31 of a flat shape which is vertically arranged so as to have one vertical surface 32 and an opposite vertical surface 33. The apparatus further includes a liquid feeding system 38 for supplying a liquid mixture 34 in a circulating manner. The liquid mixture 34 contains crystallizable components and flows down on the one vertical surface 32 as a film. A cooling medium feeding system 39 is further provided to supply a cooling medium 35 in a circulating manner. The cooling medium 35 has a temperature lower than a freezing point of the liquid mixture 34 and flows down on the opposite vertical surface 33 as a film. A heating medium feeding system 40 is further provided to supply a heating medium 37 in a circulating manner. The heating medium 37 has a temperature higher than the freezing point of the crystals and flows down on the opposite vertical surface 33 as a film.

In the crystallization apparatus as structured above, the crystallizable component in the liquid mixture 34 is crystallized to form crystal layers on the one vertical surface 32 by feeding the liquid mixture 34 from the liquid mixture feeding system 38 to flow down on the one vertical surface 32 as a film and simultaneously by feeding the cooling medium 35 from the cooling medium feeding system 39 as a film. Subsequently, the crystals formed on the one vertical surface 32 are melted and collected by feeding the heating medium 37 from the heating medium feeding system 40 to flow down on the opposite vertical surface 33 as a film. Accordingly, the impurity concentrations of the collected melt could be lowered.

In the foregoing crystallization apparatus, it is preferable that one feeding system can be used as the cooling medium feeding system 39 and the heating medium feeding system 40.

Now, a crystallization apparatus according to a third preferred embodiment of the present invention will be described hereinbelow with reference to FIGS. 8A and 8B. The third preferred embodiment is the same as the foregoing second preferred embodiment except that the upper portion of the flat plate 31 is bent to provide the inclined surface 24. The liquid mixture 34 is poured onto the inclined surface 24 through the liquid mixture feeding system 38 so that the liquid flows down on the one vertical surface 32. Since the liquid mixture is fed onto the inclined surface 24, the liquid mixture flows down on the one vertical surface 32 at substantially uniform velocities over the full width of the plate 31 to form uniform thickness of the liquid film. This makes it possible to shorten the time periods of crystallization and melting to result in great improvement in operating efficiencies in case of a large-scale processing.

The detailed structure of the plate 31 is the same as that of the plate 11 shown in FIG. 5A.

Now, a crystallization apparatus according to a fourth preferred embodiment of the present invention will be described with reference to FIG. 9.

Figure 9:
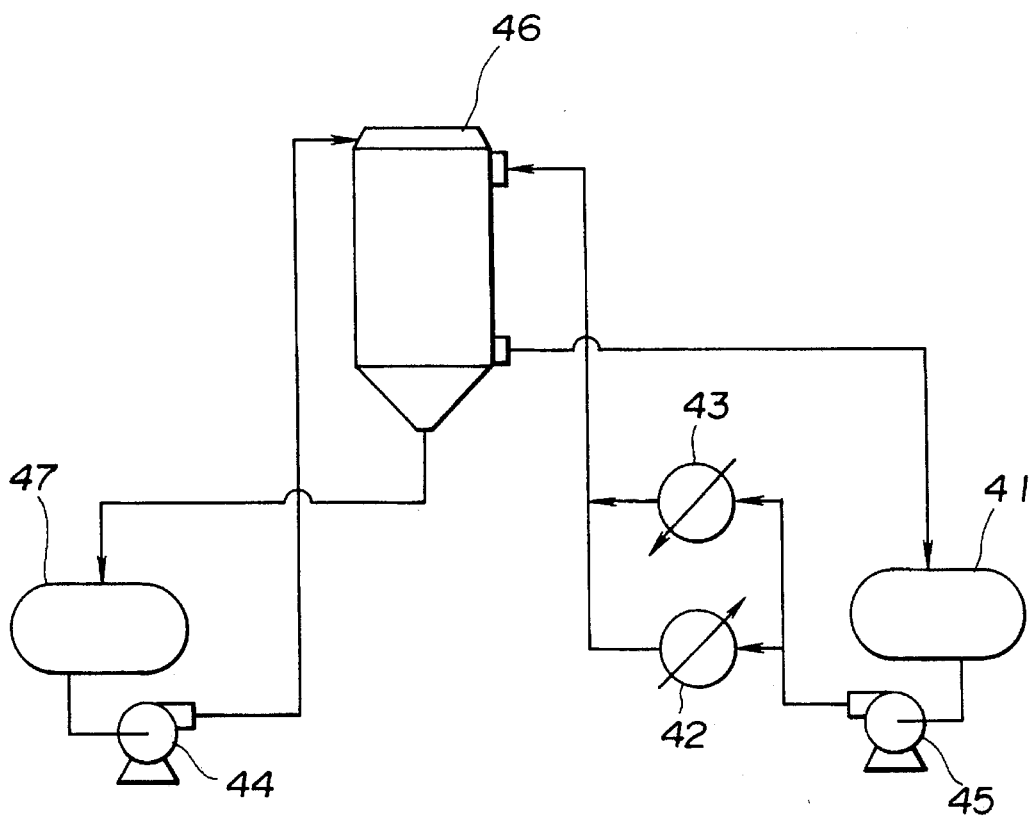
FIG. 9 is a diagram for explaining a structure of a crystallization apparatus according to a fourth preferred embodiment of the present invention.

In the crystallization apparatus in FIG. 9, the cooling medium feeding system is composed of a heat transfer medium tank 41 and a cooler 42 while the heating medium feeding system is composed of the heat transfer medium tank 41 and a heater 43. Accordingly, one heat transfer medium works as both the cooling and heating mediums. Numeral 44 denotes a feed pump for circulating the liquid mixture 34, 45 a heat transfer medium pump for circulating the heat transfer medium, that is, both the cooling and heating mediums, and 46 a crystallizer body which includes therein the plate 31 as shown in FIGS. 7A and 7B or 8A and 8B. For crystallization on the one vertical surface 32 of the plate 31, the heat transfer medium in the tank 41 is introduced to the cooler 42 via the pump 45 to be cooled to the temperature lower than the freezing point of the liquid mixture and supplied to the opposite vertical surface 33 of the plate 31 so as to work as the cooling medium 35. On the other hand, for melting the crystals on the one vertical surface 32, the heat transfer medium in the tank 41 is introduced to the heater 43 via the pump 45 to be heated to the temperature higher than the freezing point of the crystals and supplied to the opposite vertical surface 33 of the plate 31 so as to work as the heating medium 37.

According to the crystallization apparatus in FIG. 9, the heat transfer medium tank 41 functions as both cooling and heating medium tanks so that the apparatus can be simplified.

In the crystallization apparatus in FIG. 9, the heater 43 may have a function of temperature control. Specifically, the heater 43 may heat the heating medium to the temperature higher than the freezing point of the crystals to melt the whole crystals. On the other hand, the heater 43 may heat the heating medium to a relatively lower temperature for partially melting the crystals. This relatively lower temperature may be, for example, within ±5° C. of a melting point of the objective component to be recovered. Due to this operation, a sweating step can be performed so as to further lower the impurity concentration of the melt.

Further, in the crystallization apparatus in FIG. 9, a melt circulator may be provided for circulating the melt obtained by melting the crystals. According to melt circulation, the crystals are melted not only by the heating medium 37 but also by the heated melt so that the melting step can be performed for a shorter time. A liquid tank 47 and the feed pump 44 may be used for the foregoing melt circulation.

Now, a crystallization apparatus according to a fifth preferred embodiment of the present invention will be described with reference to FIGS. 10 to 13. The crystallization apparatus according to this preferred embodiment is suitable for a large-scale crystallization.

Figure 10:
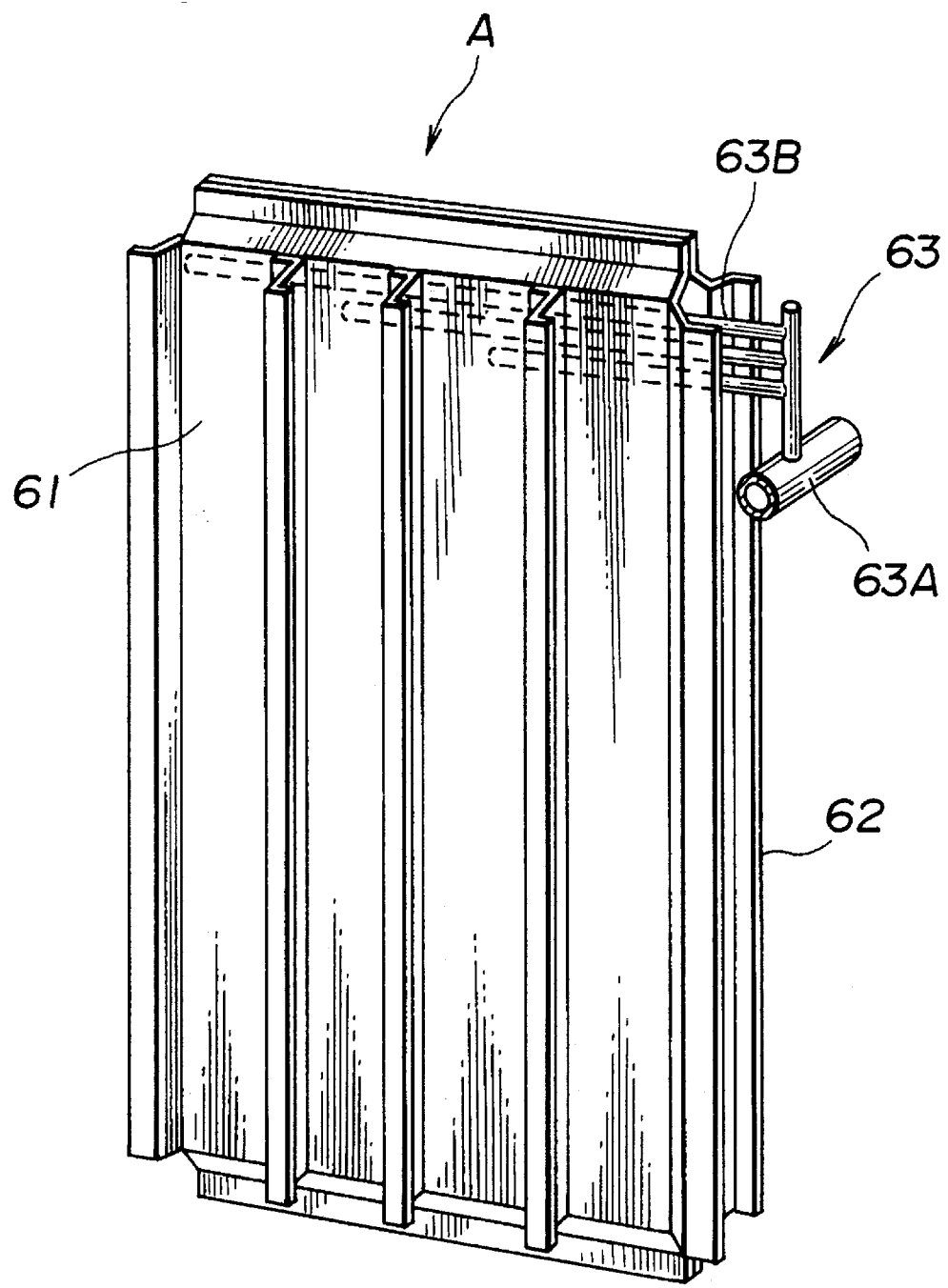
FIG. 10 is a perspective view showing a main portion of a crystallization apparatus according to a fifth preferred embodiment of the present invention, wherein a pair of crystallizer plates are illustrated as being jointed to each other.

As shown in FIG. 10, the crystallization apparatus includes a pair of plates 61 and 62 for crystallization thereon. Each of the plates 61 and 62 corresponds to the plate 31 shown in FIGS. 8A and 8B. The plates 61 and 62 are vertically assembled facing each other and connected each other at their upper and lower portions so as to form a unit A. As appreciated, the upper portions of the plates 61 and 62 have inclined surfaces corresponding to the inclined surface 24 in FIGS. 8A and 8B, and the plates 61 and 62 are jointed at the upper end portions of these inclined surfaces.

Figure 12:
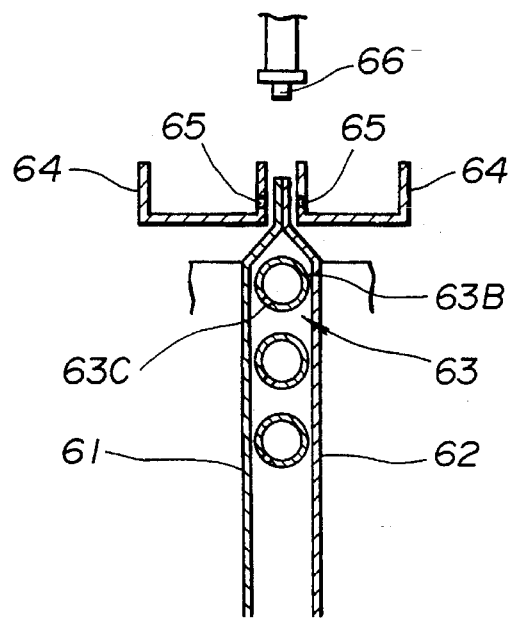
FIG. 12 is a sectional view for explaining arrangements of the main components in the crystallization apparatus according to the fifth preferred embodiment.

As shown in FIG. 12, the unit A includes therein a heat transfer medium feed pipe 63 placed at the upper portion of the vertical space between the plates 61 and 62. On the other hand, liquid distributors 64 are located outside and above the unit A to feed the liquid mixture onto the inclined surfaces of the unit A. Mother liquor which flows down the outer vertical surfaces of the unit A may be circulated to the liquid distributor 64 through circulator.

The heat transfer medium feed pipe 63 is connected to a cooling medium feeding system (not shown) so that the cooling medium is supplied therethrough and flows down on the inner vertical surfaces of the unit A to form the crystals on the outer vertical surfaces of the unit A. It is to be appreciated that, if the liquid distributor 64 is placed at a position lower than the heat transfer medium feed pipe 63, since the liquid mixture supplied through openings 65 of the liquid distributor 64 is contacted fully with the cooled surfaces, crystallization takes place from the position close to the distributor openings 65 so that the distributor openings 65 tend to be plugged. Accordingly, to avoid such plugging, it is preferable to install the liquid distributor 64 above the heat transfer medium feed pipe 63.

The heat transfer medium feed pipe 63 is also connected to a heating medium feeding system (not shown) so that the heating medium is supplied therethrough and flows down on the inner vertical surfaces to melt and recover the crystals formed on the outer vertical surfaces of the unit A. Although the cooling medium feeding system and the heating medium feeding system may be different, it is preferable that one heat transfer medium feeding system functions as both the cooling and heating medium feeding systems. Specifically, the heat transfer medium feeding system may supply the cooling medium through the heat transfer medium feed pipe 63 when crystals are formed, and may supply the heating medium through the same pipe 63 when the crystals are melted.

Figure 11:
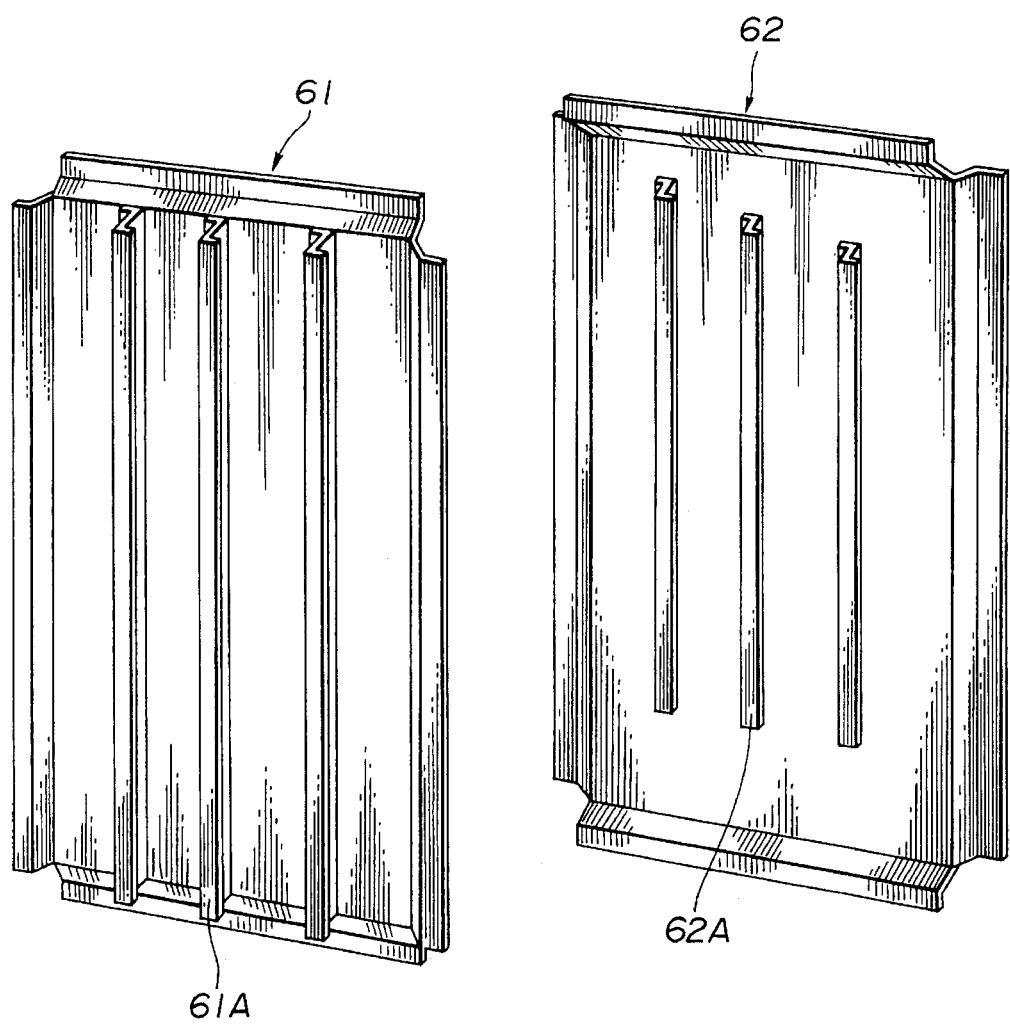
FIG. 11 is a perspective view showing the crystallizer plates shown in FIG. 10 in a disassembled state.

The plates 61 and 62 are substantially flat as shown in FIG. 11. One example of dimensions of the plates 61, 62 are that the upper or lower width is about 1.5 meters and the vertical length is about 3 meters. The plate is preferably formed of a metal, such as, iron or stainless steel since metals have high thermal conductivity and can be easily formed. Further, standard commercial iron or stainless steel plates may be purchased easily. Moreover, no special complicated techniques are required to produce such flat plates. On the other hand, it is preferable to provide support ribs 61A and 62A on the plates 61 and 62, respectively, as shown in FIG. 11. Specifically, the support ribs 61A are vertically fixed on the outer vertical surface of the plate 61 at appropriate intervals. The support ribs 62A are vertically fixed on the inner vertical surface of the plate 62 at appropriate intervals. When smoothness or flatness of the plate is bad in the liquid flow direction, that is, when there are significant irregularities on the plate surface in the liquid flow direction, the crystals are likely to peel off the plate and fall down in the course of melting step. Accordingly, the support ribs 61A and 62A are necessary to keep the sufficient smoothness or flatness of the plate in the vertical direction. The support ribs are particularly effective for large plates in view of the fact that the large thin plate tends to be bent or deformed easily. It is preferable that each support rib is formed not to disturb the flows of the liquid mixture in the form of a film.

The support ribs are not necessarily completely fixed on the plates 61, 62, but may be provided in other proper manners to keep sufficient smoothness or flatness of the plate in the liquid flow direction. The flatness in the liquid flow direction is defined as follows:

When two points are set in the liquid flow direction with a distance of 1 meter therebetween, the flatness is the maximum values of the distances between the straight line connecting those two points and the local points on the plate surface. The flatnesses are preferably within 10 mm, and more preferably within 5 mm. Further, in case of the flat plate, it is preferable that the foregoing flatness is also specified in the width direction of the plate. Specifically, it is preferable that the flatnesses defined above are also within the range as described above along the width direction.

It is further preferable that the clearance between the plates 61 and 62, that is, the clearance between the inner vertical surfaces of the plates 61 and 62 is as small as possible in view of the compactness of the apparatus. Specifically, as long as the heat transfer medium, that is, the cooling or heating medium can flow down on the paired inner vertical surfaces as films, considerably small clearances are enough. Accordingly, the clearance may be 10 mm, for example. The support ribs 62A fixed on the inner vertical surface of the plate 62 may also be used as the spacers to keep the clearances uniformly between the inner vertical surfaces of the plates 61 and 62. Specifically, by setting the height of each support rib 62A to the appropriate constant length corresponding to the required clearance and by assembling the plates 61 and 62 so that the support ribs 62A abut the inner vertical surfaces of the plate 61, the uniform clearance can be ensured.

Figure 13:
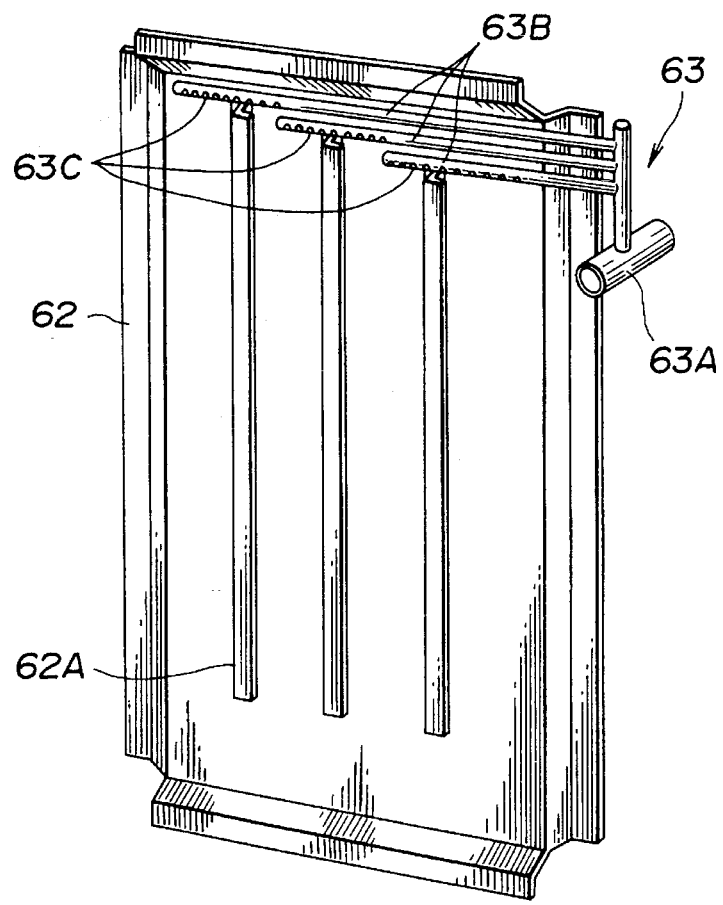
FIG. 13 is a perspective view corresponding to FIG. 10, wherein one of the crystallization plates is removed.

Both lateral ends of the plates 61 and 62 are formed enlarged as shown in FIG. 10 so as to allow the access spacing for the heat transfer medium feed pipe 63. The heat transfer medium feed pipe 63 is composed of a header pipe 63A connected to the cooling and heating medium feeding systems and three branched pipes 63B. The three branched pipes 63B are inserted in the foregoing clearance between the inner vertical surfaces of the plates 61 and 62. As shown in FIG. 13, the support ribs 62A work also as the supports for these branched pipes 63B. Each branched pipe 63B has a number of small openings 63C in the form of small holes. The openings 63C of the branched pipe 63B are made in two parallel lines and the directions of the openings face the two corresponding inner vertical surfaces of the plates 61 and 62. Further, the openings 63C of the branched pipes 63B are designed as shown in FIG. 13 so as to share the three respective lateral regions so that the liquid is uniformly distributed through the openings even for the wide plates 61 and 62. Accordingly, the cooling medium is uniformly distributed through the openings 63C and flows down on the inner vertical surfaces of the plates 61 and 62 as uniform films. As a result, the crystals can grow at uniform rate on the outer vertical surfaces of the unit A over substantially the full width of the plates 61 and 62.

The number of the branched pipes 63B is not limited to three as in this preferred embodiment, but should be varied based on a diameter of the branched pipe 63B, that is, the clearance between the plates 61 and 62, the flow rate of the heat transfer medium and the width of the plate 61, 62. In other words, the branched pipes 63B should be designed so that the heat transfer medium is uniformly distributed in the width direction of the plates 61 and 62.

The liquid distributors 64 have numerical openings 65 at the bottom portions and in the lateral direction of the corresponding plate 61 or 62. With this arrangement, the liquid mixture is supplied from the liquid distributors 64 to flow down uniformly on the outer vertical surfaces of the plates 61 and 62 uniformly in the form of films. As shown in FIG. 12, spray nozzles 66 are provided over the liquid distributors 64 to supply the liquid mixture continuously. The spray nozzles 66 may be replaced by other types of liquid supplying devices.

In the crystallization apparatus according to the fifth preferred embodiment, the desired amount of crystals is formed on the outer vertical surfaces of the unit A by introducing the cooling medium through the heat transfer medium feed pipe 63 to flow down on the inner vertical surfaces of the unit A as films while introducing the liquid mixture from the liquid distributor 64 to flow down on the outer vertical surfaces of the unit A as films. Subsequently, the formed crystals are melted and collected by introducing the heating medium through the heat transfer medium feed pipe 63 to flow down on the inner vertical surfaces of the unit A as films. Accordingly, with the simple structure, the crystallization rate per unit time can be twice as that obtained when one crystallizer plate is used.

Further, in the crystallization apparatus according to the fifth preferred embodiment, the heat transfer medium, that is, the cooling/heating medium may be circulated repeatedly. When it is necessary to further lower product impurity concentrations, the collected melt obtained by the foregoing single-stage process may be recycled as the liquid mixture and recrystallized in the same manner as described above. When performing such multi-stage processes, it may be arranged that the crystals are formed on the outer vertical surfaces of the unit A and the mother liquor obtained at the Nth stage is reused by adding it to the liquid mixture for the (N–1)th stage. It may be further arranged that the heating medium of the temperature higher than the freezing point of the crystals is introduced to flow down on the inner vertical surfaces of the unit A as films, and simultaneously, the liquid mixture for the (N+1)th stage is heated and introduced to flow down on the crystal layers formed on surfaces of the unit A, so as to accelerate melting of the crystals at the Nth stage. It may be further arranged that the melt collected at the Nth stage is cooled to obtain new crystal layers and mother liquor at the (N+1)th stage, and that the mother liquor is reused by adding it to the liquid mixture for the Nth stage.

Further, in the crystallization apparatus according to the fifth preferred embodiment, the heating medium feeding system or the heat transfer medium feeding system may have a heater with a function of temperature control to perform the sweating operation if necessary. Specifically, before introducing the heating medium of the temperature higher than the freezing point of the crystals onto the inner vertical surfaces of the unit A to melt the whole crystals, the heating medium whose temperature is, for example, within ±5° C. of a melting point of the component to be recovered, is introduced onto the inner vertical surfaces of the unit A as films so as to partially melt the crystal layers formed on the outer surfaces of the unit A.

Further, in the crystallization apparatus according to the fifth preferred embodiment, a melt circulator may be provided to accelerate melting of the crystals. Specifically, when melting the crystals by introducing the heating medium of the temperature higher than the freezing point of the crystals down on the inner vertical surfaces of the unit A, it may be arranged that the melt is heated and circulated through the liquid distributors 64 so as to flow down on the outer vertical surfaces of the unit A.

Now, a crystallization apparatus according to a sixth preferred embodiment of the present invention will be described with reference to FIGS. 14 and 15. The crystallization apparatus according to this preferred embodiment is suitable for purifying the liquid mixture on a large scale compared with the foregoing fifth preferred embodiment.

Figure 14:
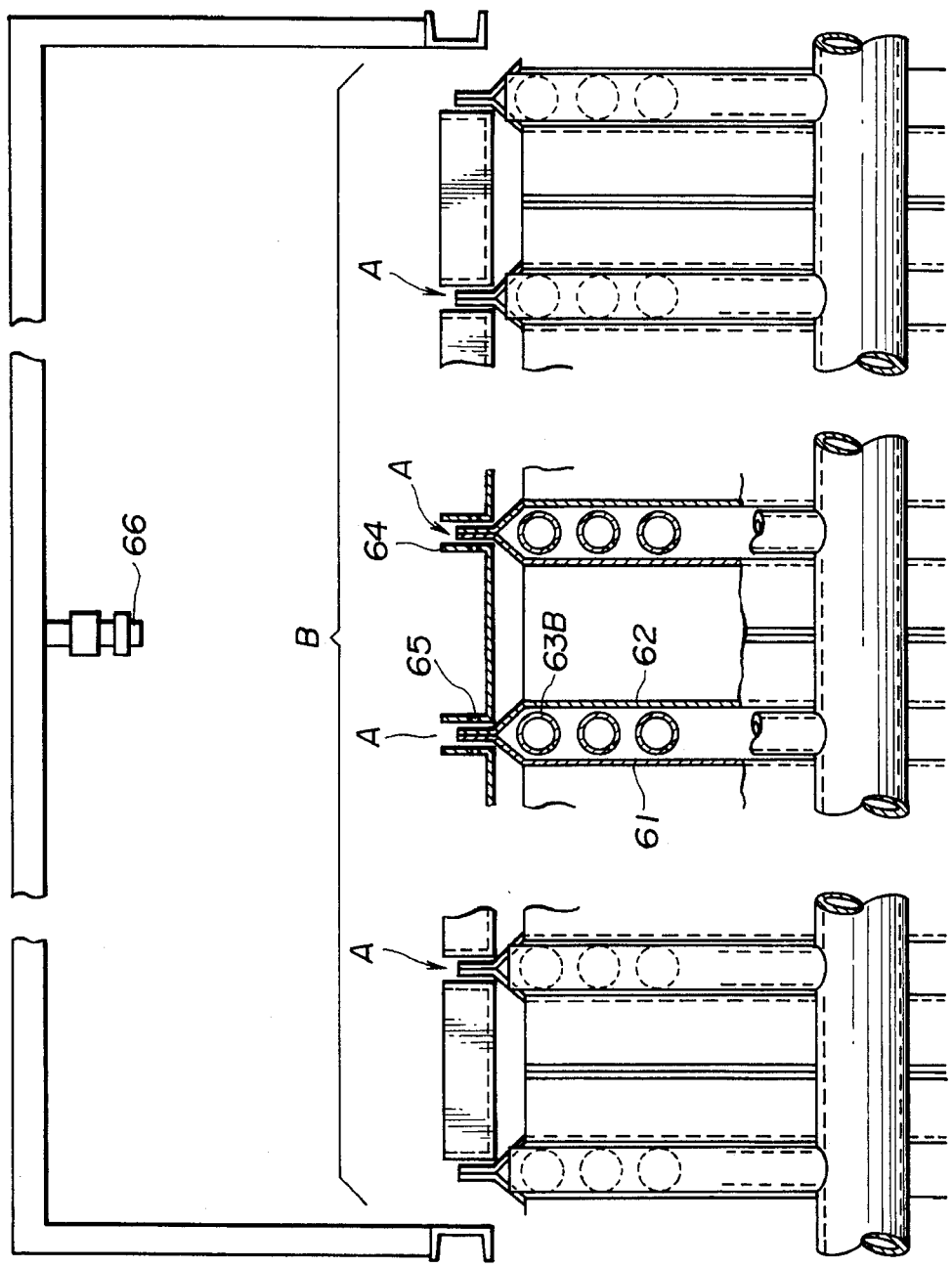
FIG. 14 is a partly-sectioned diagram for explaining a crystallization apparatus according to a sixth preferred embodiment of the present invention.

As shown in FIG. 14, the crystallization apparatus includes a number of the foregoing units A which are arranged in parallel so as to form a block B. Specifically, the outer vertical surfaces of the adjacent units A are assembled facing each other with desired clearances therebetween. The liquid mixture introduced from each of the liquid distributors 64 flows down on the outer vertical surfaces of the corresponding adjacent units A as films, respectively. On the other hand, the cooling/heating mediums are introduced from the heat transfer medium feed pipes to flow down on the inner vertical surfaces of each unit A as films.

As shown in FIG. 15, the plates 61 and 62 of the unit A have outwardly bent enlarged portions 68 at the lateral side ends of the plate. The adjacent units A are joined to each other by fixedly coupling the outwardly bent portions 68. The minimum clearance between the outer vertical surfaces of the adjacent units A is the clearance for crystal layers plus the space clearance for the liquid mixture to flow down on the outer vertical surfaces in the form of films. For example, when the maximum thickness of the crystal layers on the both outer vertical surfaces is 10 mm, the desirable clearance may be 30 mm in consideration of a proper clearance between the crystal layers to be formed. The support ribs 61A provided on the outer vertical surface of the plate 61 may be used as the spacers to keep the clearance uniformly between the outer vertical surfaces of the adjacent units A. Specifically, by setting the height of each support rib 61A to the appropriate constant length corresponding to the required clearance and by assembling the adjacent units A so that the support ribs 61A abut the outer vertical surface of the plate 62, the uniform clearance can be ensured.

The connecting pipe 63A for the heat transfer medium feeding system is the header pipe for the branched pipes of the units A constituting the block B. As in the foregoing fifth preferred embodiment, the three branched pipes 63B are branched from the connecting pipe 63A and are inserted in the space between the inner vertical surfaces of each unit A.

According to the sixth preferred embodiment, since a number of the units A are assembled in parallel to constitute the block B, a large-scale crystallization apparatus can be easily structured. Further, since the units A used in this preferred embodiment are identical to each other, the two plates 61 and 62 constituting each unit A can be standardized and mass-produced, to reduce manufacturing costs of the crystallization apparatus.

Now, a crystallization apparatus according to a seventh preferred embodiment of the present invention will be described with reference to FIGS. 16 and 17. The crystallization apparatus according to this preferred embodiment is suitable for purifying the liquid mixture on a further larger scale as compared with the case in the foregoing sixth preferred embodiment.

Figure 16:
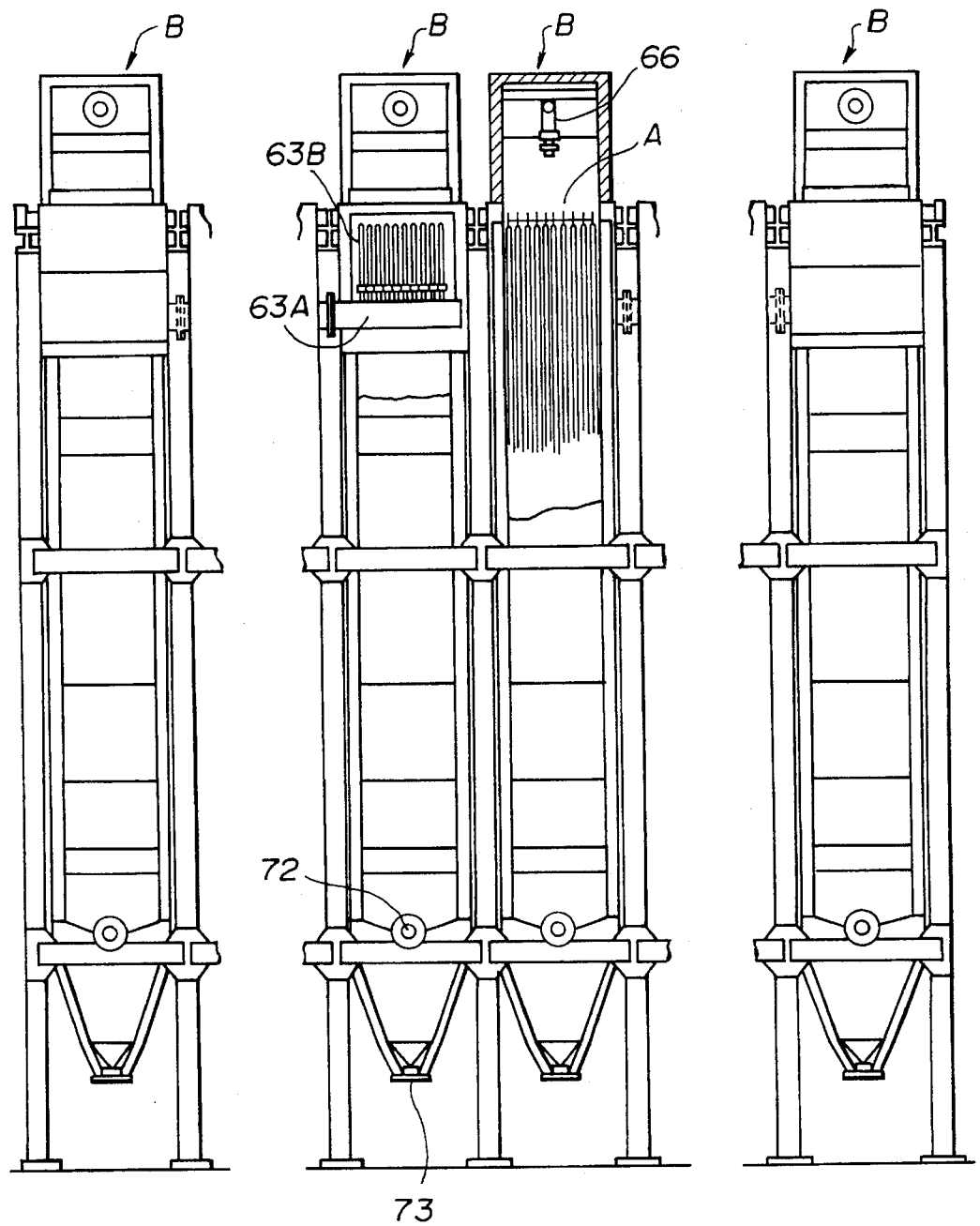
FIG. 16 is a partly-broken diagram showing a schematic front elevation of a crystallization apparatus according to a seventh preferred embodiment of the present invention.

As shown in FIG. 16, the crystallization apparatus includes a number of the foregoing blocks B which are assembled in parallel. Each block B includes the units A which are ten in number and are assembled in parallel, and the crystallization apparatus includes, for example, the seven blocks B. In each block B, the spray nozzles 66, which are, for example, three in number, are provided over the units A along the width direction of the plate 61, 62 to continuously supply the liquid mixture. As appreciated, the liquid mixture is supplied through these spray nozzles 66 to the outer vertical plate surfaces of the units A. The supplied liquid mixture flows down on the outer vertical plate surfaces of the units A as films while being cooled by the cooling medium. Accordingly, the crystals are formed on the outer vertical plate surfaces of the units A, and the mother liquor, that is, the residual liquid mixture, is discharged through drain nozzles 73 provided at the bottom side of each block B. The discharged mother liquor is circulated and resupplied through the spray nozzles 66 for successive crystallization on the outer vertical surfaces of the units A. It is preferable to locate the drain nozzles 73 at the position lower than drain nozzles 72 of the heat transfer medium so as to prevent the drain nozzles 73 from being plugged due to solidification of the liquid mixture.

Since it may be possible that small crystals fall off the plate surfaces when crystal nuclei are generated in the course of crystallization step, it is preferable to enlarge the drain nozzles 73 or to provide bypass lines to avoid the plugging of the drain nozzles 73. Further, it is preferable to provide isolation materials, such as, metal screens or grids just over the drain nozzles 73 for receiving the fallen crystals during the step of melting the crystals in order to separate the fallen crystals from the mother liquor. By providing such isolation materials, plugging of the drain nozzles 73 can be effectively prevented.

Figure 17:
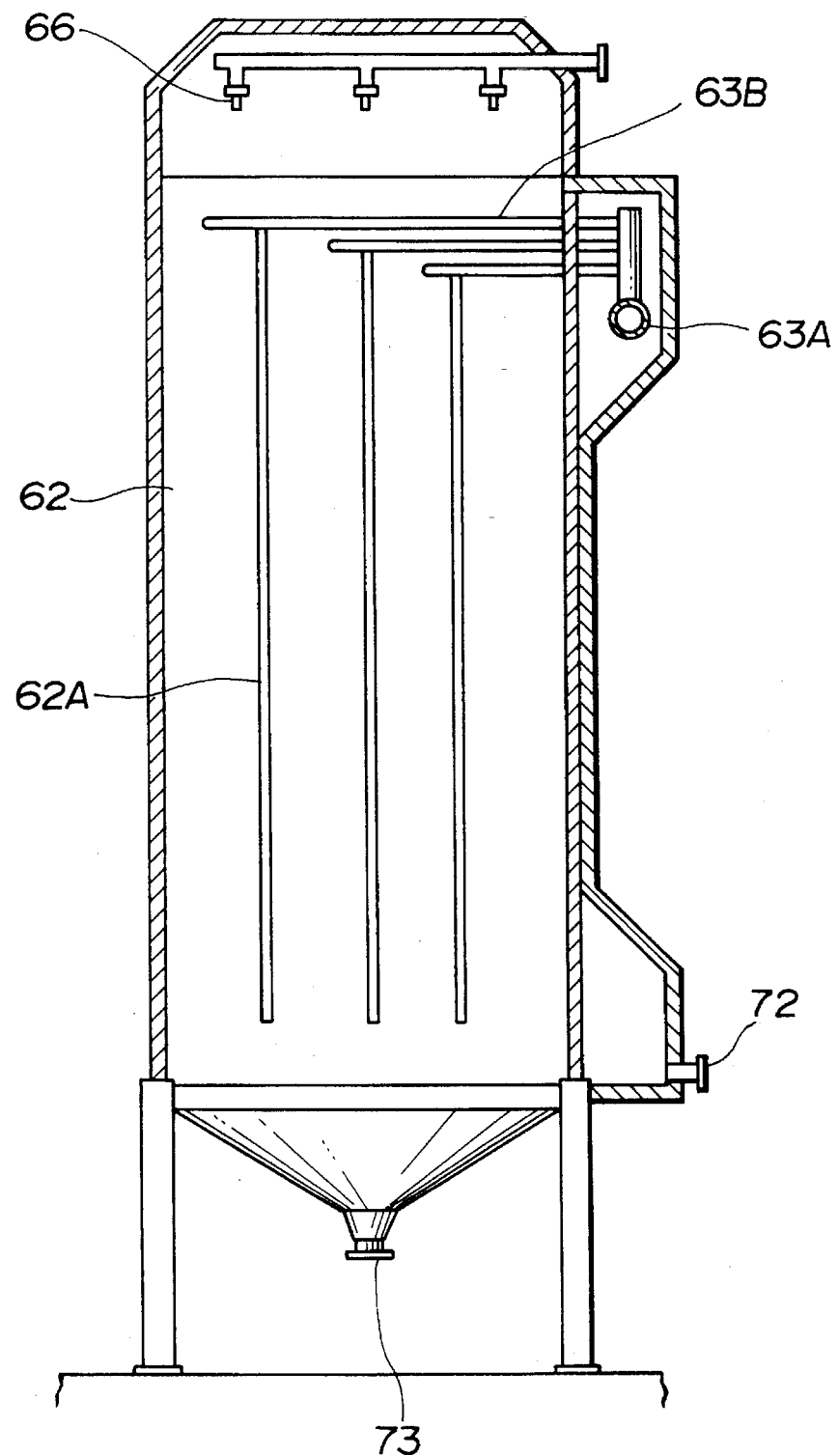
FIG. 17 is a cross-sectional view through vertical axis showing a schematic side vie, w of the crystallization apparatus according to the seventh preferred embodiment.

In each block B, the branched pipes 63B are inserted in each unit A and connected to the connecting header pipes 63A as in the foregoing sixth preferred embodiment and as shown in FIG. 17. The connecting header pipes 63A of the seven blocks B are commonly connected to be unified so that the heat transfer medium, that is, the cooling/heating medium is supplied to all the blocks B via the unified common connecting header pipes 63A and are supplied to the inner vertical surfaces of the units A through the openings 63C of the branched pipes 63B. The drain nozzles 72 are provided at the bottom and lateral side end of each block B for discharging the cooling/heating medium. The discharged cooling/heating medium is circulated.

According to the seventh preferred embodiment, since a number of the blocks B are assembled in parallel, a further large-scale crystallization apparatus can be easily structured. Further, even when the unit A is troubled, replacement is possible by unit of the block B so operation of the whole crystallization apparatus can be continued. Further, it is advantageous that the block can be repaired during the operation.

It is to be appreciated that, in the crystallization apparatus according to the seventh preferred embodiment, when processing a large quantity of the liquid mixture, the same single-stage processing may be performed in all the blocks B in parallel, or a different step of the processing may be performed per block B.

Figure 18:
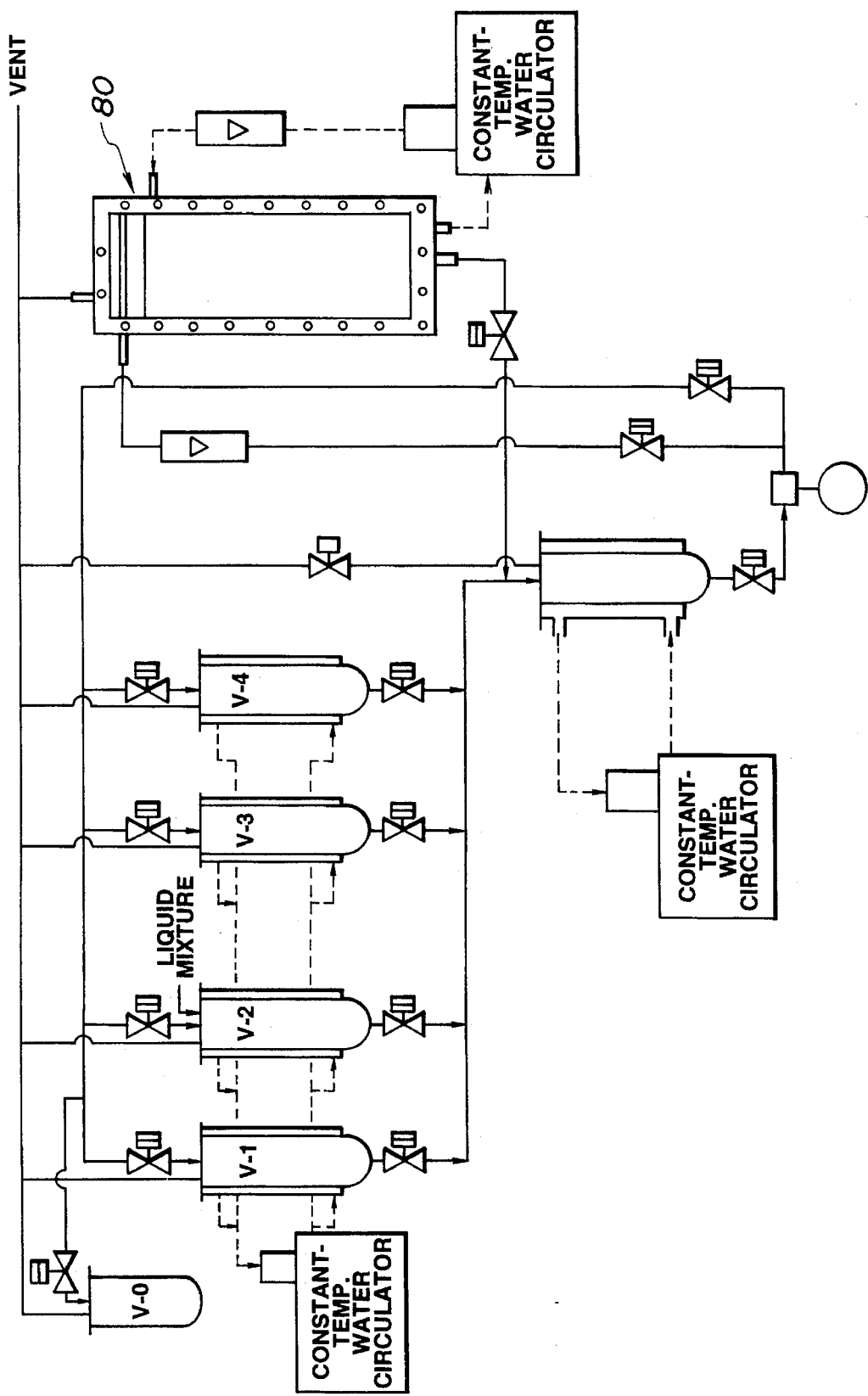
FIG. 18 is a diagram showing a schematic structure of a multistage crystallization apparatus according to an eighth preferred embodiment of the present invention.

Now, a multi-stage crystallization apparatus will be described according to an eighth preferred embodiment of the present invention. FIG. 18 shows a schematic structure of this multi-stage crystallization apparatus.

As shown in FIG. 18, the multi-stage crystallization apparatus includes a mother liquor storage tank V-0, a first storage tank V-1, a second storage tank V-2, a third storage tank V-3 and a product storage tank V-4. The liquids in these storage tanks are supplied to a crystallizer body 80 via a circulation tank V-5. Further, the mother liquor, the liquid obtained by the sweating step (hereinafter referred to as "sweated liquid") and the melt from the crystallizer body 80 are first fed to the circulator tank V-5 and are circulated between the storage tanks and the crystallizer body 80.

For example, it is assumed that one typical crystallization cycle is completed by performing a first-stage crystallization once, a second-stage crystallization twice and a third-stage crystallization once. In this case, the liquid mixture is first supplied to the second storage tank V-2. In the second-stage crystallization, a mixture of the mother liquor obtained in the third-stage crystallization, the melt obtained in the first-stage crystallization, the sweated liquid obtained in the second-stage crystallization and the liquid mixture for the second-stage crystallization is supplied via the circulation tank V-5 to the crystallizer body 80 as the feed liquid to be purified. In the crystallizer body 80, the crystallization is performed twice by dividing the supplied liquid into halves. The mother liquor obtained in this second-stage crystallization is sent to the first storage tank V-1, the sweated liquid obtained in this second-stage crystallization is sent to the second storage tank V-2, and the melt obtained in this second-stage crystallization is sent to the third storage tank V-3.

In the third-stage crystallization, a mixture of the melt from the second-stage crystallization and the sweated liquid obtained in the third-stage crystallization is supplied via the circulation tank V-5 to the crystallizer body 80 as the feed liquid to be purified. The mother liquor obtained in this third-stage crystallization is sent to the second storage tank V-2, the sweated liquid obtained in this third-stage crystallization is sent to the third storage tank V-3, and the melt obtained in this third-stage crystallization is sent to the product storage tank V-4.

In the first-stage crystallization, a mixture of the mother liquor from the second-stage crystallization and the sweated liquid obtained in the first-stage crystallization is sent via the circulation tank V-5 to the crystallizer body 80 as the feed liquid to be purified. The mother liquor obtained in this first-stage crystallization is sent to the mother liquor storage tank V-0, the sweated liquid obtained in this first-stage crystallization is sent to the first storage tank V-1, and the melt obtained in this first-stage crystallization is sent to the second storage tank V-2.

In this manner, one crystallization cycle is completed.

According to the multi-stage crystallization apparatus as described above, the high-purity product can be obtained, and further, the product recovery efficiency is also improved.

EXAMPLES

The results of some experiments will be described hereinbelow.

Example 1

The crystallization apparatus shown in FIGS. 7A and 7B was used. As shown in FIGS. 7A and 7B, acrylic acid was supplied onto the flat plate 31 from above and obliquely, and the crystallization was performed. The surface of the crystallizer plate 31 has a width of 200 mm and a height of 600 mm, and 1,200 g. of acrylic acid was used as the liquid mixture. The crystallization was continued until 840 g. of the crystals were formed. A final mean thickness of the crystal layer was 7 mm. A 30% by weight ethanol aqueous solution was used as the cooling medium, and an inlet temperature of the cooling medium to the crystallization apparatus was controlled at 2° C. The liquid splashed on the surface in the course of crystallization and the surfaces of the crystal layer formed were significantly corrugated. It took 35 minutes to finish the crystallization step.

In order to make visual observations, a transparent poly (vinyl chloride) plate was attached to the front side of the crystallization apparatus.

Example 2

The crystallization apparatus shown in FIGS. 8A and 8B was used, wherein the angle θ of the inclined surface 24 was 45 degrees. The experiment was conducted in the same manner as in Example 1 except that acrylic acid was introduced onto the inclined surface 24 as shown in FIG. 8A. On this experiment, the liquid did not splash on the plate surface and no marked roughness was observed on the crystal layer. It took 25 minutes to complete the crystallization step.

Example 3

In Example 2, the cooling medium was heated up to 15° C. to work as the heating medium and was circulated for the sweating step to melt partially the crystals formed in Example 2. As a result, 90 g. of the crystals were melted in 5 minutes. Although it was observed that the melting occurred near the surface of the plate 31 and the melt flowed down on the plate surface, the crystals remained adhered to the plate surface without falling off. Subsequently, the heating medium was further heated up to 25° C. and was circulated so as to melt all the remaining crystals. Similar to the sweating step, the melting proceeded with almost all the crystals being adhered to the plate surface. This melting step required 5 minutes.

Comparative Example 1

In order to make a visual observation, Pyrex-glass double tubes with 40 mm inner diameter for an inner tube, 70 mm outer diameter for an outer tube, a height of 1,160 mm were used. The crystallization was performed by supplying acrylic acid onto an inner surface of the inner tube as a film and by supplying the cooling medium between the inner and outer tubes. A metal screen was placed at the bottom of the double tubes to prevent the crystals from falling off. 1,200 g. of acrylic acid was used as the liquid mixture, and the crystallization was continued until 840 g. of the crystals were formed. A final mean thickness of the crystal layer was 7 mm. A 30% by weight ethanol aqueous solution was used as the cooling medium, and an inlet temperature of the cooling medium to the crystallization apparatus was controlled at 2° C. The crystallization step required 35 minutes.

Thereafter, the cooling medium was heated up to 15° C. to work as the heating medium and was circulated for the sweating step. 90 g. of the crystals were melted in 7 minutes. Melting occurred on the inner surface of the inner tube and the crystals formed fell off the surface down to the metal screen at the bottom of the tube. The heating medium was further heated up to 25° C. and was circulated to melt all the remaining crystals. However, due to the clearance between the surface of the crystal layer and the tube inner surface, effective melting did not proceed. Accordingly, the melt was heated up to 25° C. and was circulated. However, since the melt flowed down through the clearance, the melting proceeded so slowly that it took 35 minutes to melt all the crystals.

Example 4

The multi-stage crystallization apparatus shown in FIG. 18 was used, wherein the crystallizer body 80 was the same as that used in Example 2. The liquid mixture was supplied to the second storage tank V-2. In the second-stage crystallization, 766 g. of the mother liquor from the third-stage crystallization, 754 g. of the melt from the first-stage crystallization, 168 g. of the sweated liquid from the second-stage crystallization and 1,520 g. of the new feed liquid were mixed to produce 3,208 g. of the liquid mixture. The liquid mixture was divided into halves to be crystallized twice. Through one operation of the second-stage crystallization, 763 g. of the mother liquor, 84 g. of the sweated liquid and 757 g. of the melt were obtained. As a result, through two operations in the second-stage crystallization process, 1,526 g. of the mother liquor were obtained and sent to the first storage tank V-1, 168 g. of the sweated liquid were obtained and sent to the second storage tank V-2, and 1,514 g. of the melt were obtained and sent to the third storage tank V-3.

In the third-stage crystallization, 1,514 g. of the melt from the second-stage crystallization and 84 g. of the sweated liquid from the third-stage crystallization were mixed to produce 1,598 g. of the liquid mixture for the feed stock, and 760 g. of the mother liquor, 84 g. of the sweated liquid and 754 g. of the melt were obtained. The mother liquor was sent to the second storage tank V-2, the sweated liquid was sent to the third storage tank V-3 and the melt was sent to the product storage tank V-4. Similarly, in the first-stage crystallization, 1,526 g. of the mother liquor from the second-stage crystallization and 84 g. of the sweated liquid were mixed to produce 1,610 g. of the liquid mixture for the feed stock, and 766 g. of the mother liquor, 84 g. of the sweated liquid and 760 g. of the melt were obtained. The mother liquor was sent to the final mother liquor storage tank V-0, the sweated liquid was sent to the first storage tank V-1 and the melt was sent to the second storage tank V-2. In this manner, one crystallization cycle was completed by performing the first-stage crystallization once, the second-stage crystallization twice and the third-stage crystallization once, and 754 g. of the product and 766 g. of the final mother liquor were obtained from 1,520 g. of the feed liquid mixture. Through the whole-stage crystallization, the crystallization temperature was controlled at 2° C., the sweating temperature at 15° C. and the melting temperature at 25° C.

Impurity concentrations of the liquid mixture, the product and the final mother liquor are shown in Table 1, in which the figures are in ppm by weight.

TABLE 1

| liquid mixture | 870 |
| product | 70 |
| final mother liquor | 1,630 |

Table 1 shows that the purified product can be obtained by performing the multi-step crystallization. The number of crystallization stages is not limited to three as in this experiment, but may be increased to improve the purity and the recovery of the product. Further, when one crystallizer body is used for performing the multi-stage crystallization as in this experiment, it is effective to moderately equalize the amount of the feed liquid mixtures to be separated in each crystallization stage. This can be fulfilled by varying the number of operation in each crystallization stage as in this experiment.

Example 5

The unit A as shown in FIG. 10 was assembled using a pair of plates each having a width of 0.5 meters and a height of 1.5 meters. Further, the block B as shown in FIG. 14 was made assembling the two units A in parallel. This block B was used as the crystallization apparatus. The clearance between the inner vertical surfaces of each unit A was 10 mm, and the clearance between the outer vertical surfaces of the two units A was 30 mm. A 30% by weight ethanol aqueous solution was used as the cooling medium, and an inlet temperature of the cooling medium to the crystallization apparatus was controlled at 2° C. As shown in FIG. 9, the cooling medium was circulated by the heat transfer medium pump 45 and flows down on the inner vertical surfaces of each unit A as films. On the other hand, 30 kg of acrylic acid whose impurity concentration is 870 ppm, were used as the feed liquid mixture. The liquid mixture was circulated by the feed pump 44 to flow down on the outer vertical surfaces of the units A as films. By monitoring a liquid level of the feed tank 47, the circulation of the liquid mixture was stopped when 21 kg of the crystals were formed.

Thereafter, the cooling medium was heated by the heater 43 up to 15° C. and was circulated as the heating medium to flow down on the inner vertical surfaces of each unit A as films so as to perform the sweating step to melt 2 kg of the crystals. Further, the heating medium was heated by the heater 43 up to 25° C. and was circulated to flow down on the inner vertical surfaces of each unit A as films so as to melt all the remaining crystals. As a result, the mother liquor with impurity concentration of 2,030 ppm by weight, the sweated liquid with impurity concentration of 720 ppm by weight and the melt with impurity concentration of 290 ppm by weight were obtained. Accordingly, high-purity acrylic acid containing very small amounts of acetic acid and propionic acid were obtained. The results of this experiment are shown In Table 2. Further, plugging of the pipes and falling-off of the crystals in the course of melting the crystals were not generated. It can be considered that the crystals did not fall off during melting because the crystals adhered to the outer vertical plate surfaces due to surface tension of the melt.

Experiments were further performed using acrylic acids having different impurity concentrations as the feed liquid mixtures. The crystallization steps were carded out in the same manner as described above. Results are also shown In Table 2 where the figures denote impurity concentrations in ppm by weight.

TABLE 2

| Experiment No. | feed liquid mixture | mother liquor | sweated liquid | melted crystals |
|---|---|---|---|---|
| 5-1 | 870 | 2,030 | 720 | 290 |
| 5-2 | 110 | 250 | 65 | 40 |
| 5-3 | 1,900 | 5,400 | 830 | 360 |
| 5-4 | 11,400 | 40,700 | 5,600 | 920 |

Table 2 shows that high-purity acrylic acids were obtained in the experiments. Further, plugging of the pipes and falling-off of the crystals in the course of melting steps were not generated.

Example 6

Crystallization operation was carried out in the same manner as in Example 5, using crude benzene containing cyclohexane as a major impurity as the feed liquid mixture. Impurity concentrations of the melted crystals and the feed liquid mixture were 0.51% by weight and 4.6% by weight, respectively.

Example 7

Crystallization operation was performed in the same manner as in Example 5, using crude p-dichlorobenzene solution containing o-dichlorobenzene as a major impurity as the feed liquid mixture. The impurity concentrations of the melted crystals and the feed liquid mixture were 5.3% by weight and 53.5% by weight, respectively.

Example 8

A mixture containing MAA (methacrylic acid) as the component to be separated and i-BA (isobutyric acid) as the component to be removed was purified by the crystallization method. Composition of the feed liquid mixture and the melt of the obtained crystals are shown in Table 3 where the figures denote concentrations in % by weight.

TABLE 3

|  | feed liquid mixture | melted crystals |
| --- | --- | --- |
| MAA | 94.1 | 95.9 |
| i-BA | 5.3 | 3.9 |
| $H_2O$ | 0.1 | 0.1 |
| others | 0.5 | 0.1 |

Example 9

Crystallization operation was performed in the same manner as in Example 8. A xylene mixture containing p-xylene as a component to be purified was used in this experiment. The results are shown in Table 4 where the figures denote concentrations in % by weight.

TABLE 4

|  | feed liquid mixture | melted crystals |
| --- | --- | --- |
| p-xylene | 22.0 | 97.0 |
| m-xylene | 55.5 | 2.0 |
| o-xylene | 21.5 | 0.5 |
| others | 1.0 | 0.5 |

Example 10

Crystallization process was performed in the same manner as in Example 8. A mixture containing 2,6-DIPN (diisopropylnaphthalene) as a component to be purified was used in this experiment. The results are shown in Table 5 where the figures denote concentrations in % by weight.

TABLE 5

|  | feed liquid mixture | melted crystals |
| --- | --- | --- |
| 2,6-DIPN | 34.6 | 91.5 |
| 2,7-DIPN+1, 7-DIPN | 41.6 | 7.2 |
| 1.3-DIPN | 12.3 | 1.3 |
| 1,6-DIPN | 8.0 | — |
| others | 3.5 | — |

Example 11

Crystallization operation was performed in the same manner as in Example 8. A mixture containing bisphenol A as a component to be purified was used in this experiment. The results are shown in Table 6 where the figures denote concentrations in % by weight.

TABLE 6

|  | feed liquid mixture | melted crystals |
| --- | --- | --- |
| bisphenol A | 93.0 | 99.4 |
| phenol | 2.0 | 0.1 |
| isopropenyl phenol | 0.5 | — |
| ortho-para bisphenol | 4.0 | 0.5 |
| others | 0.5 | — |

Tables 3 to 6 show that separation of MAA from i-BA is difficult by the single-stage crystallization compared with the other examples. The separation of MAA and i-BA by distillation is also difficult because of their close boiling points. Accordingly, in purification of MAA and acrylic acid described before, the multi-stage crystallization is necessary to obtain high-purity products. As the crystallizer for multi-stage crystallization, the foregoing preferred embodiments of the present invention using a number of the plates are significantly advantageous compared with the multi-tube crystallization apparatus. Specifically, in the multi-tube crystallization apparatus, a number of the tubes are installed in a large cylindrical shell. Accordingly, once the mount of the liquid mixture to be processed or the number of the crystallization stages is fixed, it is practically very difficult to remove some of the tubes so as to perform turn-down operations, that is, it is very difficult to change the designed processing capacity or the number of the crystallization stages, afterwards. On the other hand, if the apparatus is designed to allow removing some of the tubes, the supplying systems for cooling/heating mediums and the liquid mixtures become inevitably very complicated. In the preferred embodiments of the present invention, on the other hand, disassembling and assembling of the units having tile flat plates are easy so that adjustment of processing capacity or the number of the crystallization stages is possible. Accordingly, the preferred embodiments of the present invention are very effective for the multi-stage crystallization processes, particularly when purifying the liquid mixtures, such as, acrylic acid or MAA on a large scale.

The foregoing description shows the present invention is effectively applicable to purification processes by crystallization, and particularly, applicable to the melt or fractional crystallization. Compounds to be separated by the crystallization are not particularly limited. For example, naphthalenes, phenols, xylenes, halogenated benzenes, organic acids, etc. are suitable compounds. The disclosed crystallization herein is particularly suitable for purification of acrylic acid.

It is to be understood that this invention is not to be limited to the preferred embodiments and modifications described above, and that various changes and modifications may be made without departing from the spirit and scope of the invention as defined in the appended claims.

What is claimed is:

1. A method of separating a crystallizable component contained in a liquid mixture, the method comprising the steps of:

circulating the liquid mixture to one side surface of a flat vertical plate, said mixture flowing down on said one side surface of the plate or crystal layers as a film;

supplying a cooling medium of a temperature lower than a freezing point of the liquid mixture onto an opposite side surface of said plate, said cooling medium flowing down on said opposite side surface of the plate as a film so as to form a desired amount of crystals of the crystallizable component on said one side surface; and supplying a heating medium of a temperature higher than a freezing point of the crystals onto said opposite side surface, said heating medium flowing down on said opposite side surface as a film so as to melt and recover the crystals formed on said one side surface of the plate.

2. The method as set forth in claim 1, wherein said mixture is circulated to said one side surface at substantially uniform velocities along a lateral direction of the plate so as to flow down on said one side surface with sufficiently uniform thicknesses.

3. The method as set forth in claim 2, further comprising the step of circuculating the liquid mixture to an inclined plate surface located at an upper portion of the vertical plate to improve the uniformity of the liquid velocities.

4. The method as set forth in claim 1, wherein said cooling medium and said heating medium are the same heat transfer medium, said heat transfer medium cooled to work as the cooling medium and heated to work as the heating medium.

5. The method as set forth in claim 1, further comprising the step of introducing a heating medium to the opposite side surface of the plate as a film so as to partially melt the crystals prior to the succeeding step of melting the total crystals.

6. The method as set forth in claim 1, further comprising the step of introducing the melt of the crystals onto said one side surface while supplying the heating medium onto said opposite surface, to accelerate melting of the crystals.

7. A method of performing crystallization steps repeatedly in a multi-stage manner, each crystallization stage separating crystals of a crystallizable component contained in a liquid mixture and a mother liquor as a residual liquid mixture, the method comprising the steps of:

circulating, in a current crystallization stage (Nth stage), the liquid mixture to one side surface of a flat vertical plate via an inclined plate surface located at an upper portion of the plate, said mixture flowing down on said one side surface of the plate or crystal layers as a film;

circulating, in the Nth crystallization stage, a cooling medium of a temperature lower than a freezing point of the liquid mixture to an opposite side surface of the plate, said cooling medium flowing down on said opposite side surface as a film so as to obtain a desired amount of crystals on said one side surface and the residual mother liquor;

using said mother liquor from the Nth crystallization stage as a feed liquid for an (N−1)th crystallization stage, by adding said mother liquor to a feed liquid mixture to be supplied for the (N−1)th crystallization stage;

circulating, in the Nth crystallization stage, a heating medium of a temperature higher than a freezing point of the crystals to said opposite side surface, said heating medium flowing down on said opposite side surface as a film so as to melt and recover the crystals formed on said one side surface of the plate;

heating, in the Nth crystallization stage, the liquid mixture for an (N+1)th crystallization stage and introducing said heated liquid mixture to said one side surface at the Nth crystallization stage so as to rapidly melt and recover the crystals; and using, in the (N+1)th crystallization stage, the melt of the crystals recovered in the Nth crystallization stage as the liquid mixture.

8. The method as set forth in claim 7, wherein multi-stage crystallization operations are carried out by equalizing amounts of the feed liquid mixture in each crystallization stage.

9. An apparatus for separating a crystallizable component contained in a liquid mixture, the apparatus comprising:

a flat vertical plate;

liquid mixture feeding means for circulating the liquid mixture to one side surface of said plate, said mixture flowing down on said one side surface of the plate or crystal layers as a film;

cooling medium feeding means for supplying a cooling medium of a temperature lower than a freezing point of the liquid mixture to an opposite side surface of said plate, said cooling medium flowing down on said opposite side surface of the plate as a film; and heating medium feeding means for supplying a heating medium of a temperature higher than a freezing point of the crystals to said opposite side surface of the plate, said heating medium flowing down on said opposite side surface as a film.

10. The apparatus as set forth in claim 9, wherein said liquid mixture feeding means includes a distributor for uniformly distributing the liquid mixture along a lateral direction of the vertical plate, and wherein said mixture is circulated to said one side surface through said distributor.

11. The apparatus as set forth in claim 10, wherein said plate is provided with an inclined surface located at its upper portion, and wherein said mixture is circulated to said inclined surface via said distributor.

12. The apparatus as set forth in claim 11, wherein a redistributor is provided on said inclined surface of the plate.

13. The apparatus as set forth in claim 9, wherein said cooling medium feeding means comprises a cooling medium tank, a pump and a cooler and said heating medium feeding means comprises a heating medium tank, a pump and a heater, and wherein said cooling and heating mediums are the same medium and said cooling medium tank is also used as the heating medium tank.

14. An apparatus for separating a crystallizable component contained in a liquid mixture, the apparatus comprising:

a unit including a pair of vertical flat plates each having an inwardly bent inclined surface at its upper portion, said pair of the plates jointed each other at the top ends of the plates with said inclined surfaces;

liquid mixture feeding means for circulating the liquid mixture to outer surfaces of the plates of the unit, said liquid mixture flowing down on the outer surfaces of the plates of the unit including crystal layer surfaces as films;

cooling medium feeding means for circulating a cooling medium of a temperature lower than a freezing point of the liquid mixture to inner surfaces of the plates of the unit, said cooling medium flowing down on the inner surfaces of the plates of the unit as films; and heating medium feeding means for circulating a heating medium of a temperature higher than a freezing point of the crystals to said inner surfaces of the plates, said heating medium flowing down on said inner surfaces as films.

15. The apparatus as set forth in claim 14, wherein vertical supports are provided between the flat plates to improve and maintain the flatness of the vertical plates.

16. An apparatus for separating a crystallizable component contained in a feed liquid mixture, the apparatus comprising:

a block having a number of units which are assembled in parallel with a specified clearance therebetween, each of said units including a pair of vertical flat plates each having an inwardly bent inclined surface at its upper portion, said pair of the plates jointed each other at the top ends of the plates with said inclined surfaces;

liquid mixture feeding means for circulating the liquid mixture to outer surfaces of the plates of each unit, said mixture flowing down as films on the outer surfaces of the plates of each unit including said inclined surfaces and crystal layers;

cooling medium feeding means for circulating a cooling medium of a temperature lower than a freezing point of the liquid mixture to inner surfaces of the plates of each unit, said cooling medium flowing down on said inner surfaces as films; and heating medium feeding means for circulating a heating medium of a temperature higher than a freezing point of the crystals to said inner surfaces of the plates of each unit, said heating medium flowing down on said inner surfaces as films.

17. The apparatus as set forth in claim 16, wherein vertical supports are provided on the surfaces of all the vertical plates to improve and maintain the flatness of the plates and to keep uniform clearances between the plates.

18. The apparatus as set forth in claim 17, wherein at least one more block is provided to be combined with said former block, said one more block constituting a new larger composite including said former block.

* * * * *

UNITED STATES PATENT AND TRADEMARK OFFICE
CERTIFICATE OF CORRECTION

PATENT NO. : 5,546,763
DATED : August 20, 1996
INVENTOR(S) : Kazuo KIKUCHI et al.

It is certified that error appears in the above-indentified patent and that said Letters Patent is hereby corrected as shown below:

On the title page, item [73] should read as follows:

--[73] Assignee: JGC CORPORATION, Tokyo, Japan and MITSUBISHI CHEMICAL CORPORATION, Tokyo, Japan--

Signed and Sealed this

First Day of April, 1997

Attest:

BRUCE LEHMAN

Attesting Officer

Commissioner of Patents and Trademarks